US012066776B2

(12) United States Patent
Ciupak

(10) Patent No.: US 12,066,776 B2
(45) Date of Patent: Aug. 20, 2024

(54) ELECTROPHOTOGRAPHIC PRINTING DEVICES, SYSTEMS, AND METHODS

(71) Applicant: Neenah, Inc., Alpharetta, GA (US)

(72) Inventor: Brian Ciupak, Munising, MI (US)

(73) Assignee: Neenah, Inc., Alpharetta, GA (US)

( * ) Notice: Subject to any disclaimer, the term of this patent is extended or adjusted under 35 U.S.C. 154(b) by 338 days.

(21) Appl. No.: 17/346,795

(22) Filed: Jun. 14, 2021

(65) Prior Publication Data

US 2021/0389704 A1 Dec. 16, 2021

Related U.S. Application Data

(60) Provisional application No. 63/039,219, filed on Jun. 15, 2020.

(51) Int. Cl.

| | |
|---|---|
| ***B41M 5/025*** | (2006.01) |
| ***G03G 13/01*** | (2006.01) |
| ***G03G 13/20*** | (2006.01) |
| ***G03G 15/01*** | (2006.01) |
| ***G03G 15/20*** | (2006.01) |

(52) U.S. Cl.

CPC ....... *G03G 15/2039* (2013.01); *B41M 5/0256* (2013.01); *G03G 13/0135* (2021.01); *G03G 13/20* (2013.01); *G03G 15/0194* (2013.01)

(58) Field of Classification Search

CPC ........... G03G 15/2039; G03G 13/0135; G03G 13/20; G03G 15/0194; B41M 5/0256

See application file for complete search history.

(56) References Cited

U.S. PATENT DOCUMENTS

| | | | |
|---|---|---|---|
| 4,599,801 | A | 7/1986 | Kronzer et al. |
| 4,863,781 | A | 9/1989 | Kronzer |
| 5,242,739 | A | 9/1993 | Kronzer |
| 5,271,990 | A | 12/1993 | Kronzer et al. |

(Continued)

FOREIGN PATENT DOCUMENTS

| | | | | |
|---|---|---|---|---|
| JP | 2019066796 A * | 4/2019 | ......... G03G 9/08724 |
| WO | 2009055158 | 4/2009 | |

*Primary Examiner* — Yaovi M Ameh

(74) *Attorney, Agent, or Firm* — Meunier Carlin & Curfman LLC

(57) ABSTRACT

Provided are methods of electrophotographically printing an image on a substrate, methods of transferring an image to a substrate, electrophotographic toner cartridge kits, and electrophotographic printing devices. A plurality of layers of toner particles may be electrophotographically printed, using toner cartridges, providing an imaged area that includes one or more colorant layers that include a colorant and a colorant-layer thermoplastic adhesive, and an adhesive layer that includes an adhesive-layer thermoplastic adhesive. The fusing temperature may be selected to heat the colorant-layer thermoplastic adhesive to a temperature greater than an activation temperature of the colorant-layer thermoplastic adhesive and/or an activation temperature of the adhesive-layer thermoplastic adhesive. The melting temperature, the fusing temperature, or melt flow rate of the colorant-layer thermoplastic adhesive corresponding to at least one of the one or more colorant layers may exceed the melting temperature, the fusing temperature, or the melt flow rate of the adhesive-layer thermoplastic adhesive.

23 Claims, 12 Drawing Sheets

(56) References Cited

U.S. PATENT DOCUMENTS

| | | | |
|---|---|---|---|
| 5,370,495 | A | 12/1994 | Montalvo et al. |
| 5,431,501 | A | 7/1995 | Hale et al. |
| 5,501,902 | A | 3/1996 | Kronzer |
| 5,575,877 | A | 11/1996 | Hale et al. |
| 5,716,900 | A | 2/1998 | Kronzer et al. |
| 5,798,179 | A | 8/1998 | Kronzer |
| 5,945,375 | A | 8/1999 | Kronzer |
| 6,113,725 | A | 9/2000 | Kronzer |
| 6,200,668 | B1 | 3/2001 | Kronzer |
| 6,265,053 | B1 | 7/2001 | Kronzer et al. |
| 6,281,166 | B1 | 8/2001 | Kronzer |
| 6,369,843 | B1 * | 4/2002 | Springett ................. G03G 8/00 347/173 |
| 6,428,878 | B1 | 8/2002 | Kronzer |
| 6,450,633 | B1 | 9/2002 | Kronzer |
| 6,703,806 | B2 | 3/2004 | Joong et al. |
| 6,916,751 | B1 | 7/2005 | Kronzer |
| 7,238,410 | B2 | 7/2007 | Kronzer |
| 7,361,247 | B2 | 4/2008 | Kronzer |
| 7,364,636 | B2 | 4/2008 | Kronzer |
| 7,470,343 | B2 | 12/2008 | Kronzer |
| 7,604,856 | B2 | 10/2009 | Kronzer et al. |
| 9,227,451 | B2 | 1/2016 | Dolsey |
| 2003/0064313 | A1 | 4/2003 | Aono |
| 2005/0145325 | A1 | 7/2005 | Kronzer |
| 2005/0181946 | A1 * | 8/2005 | Tani ..................... G03G 7/0033 503/226 |
| 2006/0019043 | A1 | 1/2006 | Kronzer |
| 2006/0283540 | A1 | 12/2006 | Kronzer |
| 2008/0160435 | A1 | 7/2008 | Lim |
| 2009/0061351 | A1 | 3/2009 | Kronzer |
| 2009/0110850 | A1 | 4/2009 | Kronzer |
| 2009/0136866 | A1 | 5/2009 | Kronzer |

* cited by examiner

ELECTROPHOTOGRAPHIC PRINTING DEVICES, SYSTEMS, AND METHODS

BACKGROUND

In recent years, a significant industry has developed which involves the application of customer-selected designs, messages, illustrations, and the like (referred to collectively hereinafter as "images") on substrates including garments and other consumer products such as T shirts, sweat shirts, hats, banners, leather goods, and the like (referred to collectively as a "production medium"). These images may be designed by a user, or may be commercially available products tailored for a specific end-use. The images may be pre-printed on a transfer sheet, or a user may print the images on a transfer sheet. The images may then be transferred from the transfer sheet to a production medium by means of heat and pressure, after which the transfer sheet may be removed. Alternatively, the images may be printed directly on a production medium.

Much effort has been directed towards generally improving the method of transfer and the appearance and durability of such images as they appear on a substrate, such as production medium. For example, commonly-assigned U.S. Pat. No. 9,227,451 provides methods for transferring an image to a substrate (i.e., a production medium), which utilizes a printable transfer sheet and a coating transfer sheet in a two-step process to transfer a printed image to the production medium. With this two-step process, first an imaged area printed on a printable transfer sheet is positioned adjacent to an adhesive transfer sheet that has a meltable adhesive layer. Heat and pressure are applied to fuse the imaged area and the meltable adhesive layer to one another. The printable transfer sheet can then be separated from the adhesive transfer sheet to form an intermediate coated imaged sheet, such that only the imaged area is coated with the meltable adhesive layer. Next, the intermediate coated imaged sheet is positioned adjacent to the production medium with the imaged area coated by the meltable adhesive layer facing the substrate, and heat and pressure are applied to the intermediate coated imaged sheet to transfer the imaged area and the meltable adhesive layer to the substrate. The meltable adhesive layer adheres to the substrate, and the intermediate coated imaged sheet can be separated from the substrate to leave the imaged area on the substrate.

The methods described in U.S. Pat. No. 9,227,451 include methods of heat-transferring a "weeded" image to a substrate, meaning that only the imaged area of the substrate is coated with the meltable adhesive layer, while the un-imaged areas of the substrate remain uncoated. These methods allow users to produce customized weeded images on substrates without the need to cut around the printed areas to remove the coating from the extraneous, non-printed areas of the transfer sheet, and without transferring an undesirable background coating to the substrate. However, these methods utilize both a printable transfer sheet and a coating transfer sheet in a two-step process, both of which generally are discarded after use as waste materials.

Accordingly, there exists a need for improved devices, systems, and methods for printing an image on a substrate such as a transfer sheet and/or transferring an image to a substrate such as a production medium, for example, to streamline or reduce the number of steps required of users and to reduce the amount of waste material generated when transferring an image from a transfer sheet to a production medium.

SUMMARY OF THE INVENTION

Aspects and advantages will be set forth in part in the following description, or may be obvious from the description, or may be learned through practicing the presently disclosed subject matter.

In one aspect, the present disclosure embraces methods of electrophotographically printing an image on a sheet, and methods of transferring an image to a substrate. Exemplary methods of electrophotographically printing an image to a sheet, such as a transfer sheet, include electrophotographically printing a plurality of layers of toner particles onto the transfer sheet to form an imaged area and fusing the imaged area at a fusing temperature. The plurality of layers of toner particles may include one or more colorant layers and an adhesive layer on top of the one or more colorant layers. The one or more colorant layers may each include an array of colorant-layer toner particles that includes a colorant and a colorant-layer thermoplastic adhesive. The adhesive layer may include an array of adhesive-layer toner particles that include an adhesive-layer thermoplastic adhesive. The fusing temperature may be selected to heat the colorant-layer thermoplastic adhesive to a temperature greater than an activation temperature of the colorant-layer thermoplastic adhesive and/or an activation temperature of the adhesive-layer thermoplastic adhesive. In exemplary embodiment, the melting temperature, the fusing temperature, or the melt flow rate of the colorant-layer thermoplastic adhesive corresponding to at least one of the one or more colorant layers exceeds the melting temperature, the fusing temperature, or the melt flow rate of the adhesive-layer thermoplastic adhesive, respectively.

Exemplary methods of transferring an image to a substrate may include positioning a transfer sheet adjacent to the substrate, heat-transferring an imaged area from the transfer sheet to the substrate, and separating the transfer sheet from the substrate, leaving the imaged area on the substrate. The imaged area may include a plurality of layers of toner particles having been electrophotographically printed on a surface of the transfer sheet. The surface of the transfer sheet with the imaged area faces the substrate. The transfer temperature may be selected to heat the adhesive-layer thermoplastic adhesive to greater than the activation temperature of the adhesive-layer thermoplastic adhesive. The adhesive-layer thermoplastic adhesive adheres to the substrate. The heat-transferring may be performed at a transfer temperature selected to heat the adhesive-layer thermoplastic adhesive to greater than the activation temperature of the adhesive-layer thermoplastic adhesive.

Methods of electrophotographically printing an image directly on a substrate that is a production medium is also contemplated.

In another aspect, the present disclosure embraces electrophotographic toner cartridge kits. Exemplary electrophotographic toner cartridge kits may include a first electrophotographic toner cartridge configured to print an adhesive layer and a second electrophotographic toner cartridge configured to print a colorant layer. The first electrophotographic toner cartridge may include a first toner container and a supply of toner particles housed in the first electrophotographic toner container. The first toner particles may include an adhesive-layer thermoplastic adhesive. The second electrophotographic toner cartridge may include a second toner container, and a supply of second toner particles housed in the second toner container. The supply of second toner particles may include a second colorant and a second colorant-layer thermoplastic adhesive. In some embodiments, the melting temperature, the fusing temperature, or the melt flow rate of the second colorant-layer thermoplastic adhesive may exceed the melting temperature, the fusing temperature, or the melt flow rate of the adhesive-layer thermoplastic adhesive, respectively.

In yet another aspect, the present disclosure embraces electrophotographic printing devices. Exemplary electrophotographic printing devices may include a first electrophotographic toner cartridge configured to print an adhesive layer and a second electrophotographic toner cartridge configured to print a colorant layer. The first electrophotographic toner cartridge may include a first toner container and a supply of first toner particles housed in the first toner container. The first toner particles may include an adhesive-layer thermoplastic adhesive. The second electrophotographic toner cartridge may include a second toner container and a supply of second toner particles housed in the second toner container. The supply of second toner particles may include a second colorant and a second colorant-layer thermoplastic adhesive. In some embodiments, the melting temperature, the fusing temperature, or the melt flow rate of the second colorant-layer thermoplastic adhesive may exceed the melting temperature, the fusing temperature, or the melt flow rate of the adhesive-layer thermoplastic adhesive, respectively.

Exemplary electrophotographic printing devices may further include a photoconductor drum operably engaged with the first electrophotographic toner cartridge and/or the second electrophotographic toner cartridge, a transfer assembly operably configured to transport a sheet past the photoconductor drum, and a fuser assembly operably configured to apply heat to the array of toner particles on the sheet at a fusing temperature. The photoconductor drum may be configured to carry a latent electrostatic image formed by light irradiation from an exposure device. During operation of exemplary electrophotographic printing devices, an array of toner particles from the first electrophotographic toner cartridge and/or the second electrophotographic toner cartridge cling to the latent electrostatic image as the photoconductor drum rotates in cooperation with the first electrophotographic toner cartridge and/or the second electrophotographic toner cartridge. The fusing temperature may be selected to heat the array of toner particles on the sheet to greater than an activation temperature of the colorant-layer thermoplastic adhesive and/or an activation temperature of the adhesive-layer thermoplastic adhesive.

In some embodiments, exemplary electrophotographic printing devices may include a first photoconductor drum and a second photoconductor drum. The first photoconductor drum may be configured to carry a first latent electrostatic image formed by light irradiation from an exposure device, and the first photoconductor drum may be configured to rotate in cooperation with the first electrophotographic toner cartridge. During operation, an array of first toner particles may cling to the first latent electrostatic image. The second photoconductor drum may be configured to carry a second latent electrostatic image formed by light irradiation from an exposure device, and the second photoconductor drum may be configured to rotate in cooperation with the second electrophotographic toner cartridge. During operation, an array of second toner particles may cling to the second latent electrostatic image.

In other embodiments, exemplary electrophotographic printing devices may include a photoconductor drum configured to carry a first latent electrostatic image and a second latent electrostatic image each formed by light irradiation from an exposure device. The photoconductor drum may be configured to rotate in cooperation with both the first electrophotographic toner cartridge and the second electrophotographic toner cartridge. During operation, an array of first toner particles may cling to a first latent electrostatic image and an array of second toner particles cling to a second electrostatic image. Exemplary electrophotographic printing devices may further include a transfer assembly operably configured to transport a sheet past the photoconductor drum, and a fuser assembly operably configured to apply heat to the first toner particles and the second toner particles on the sheet at a fusing temperature. The transfer assembly may transfer the array of first toner particles and the array of second toner particles from the photoconductor drum to the sheet. The fusing temperature may be selected to heat the array of first toner particles and/or the array of second toner particles to a temperature greater than an activation temperature of the adhesive-layer thermoplastic adhesive and/or an activation temperature of the colorant-layer thermoplastic adhesive.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures.

Figure 1A:
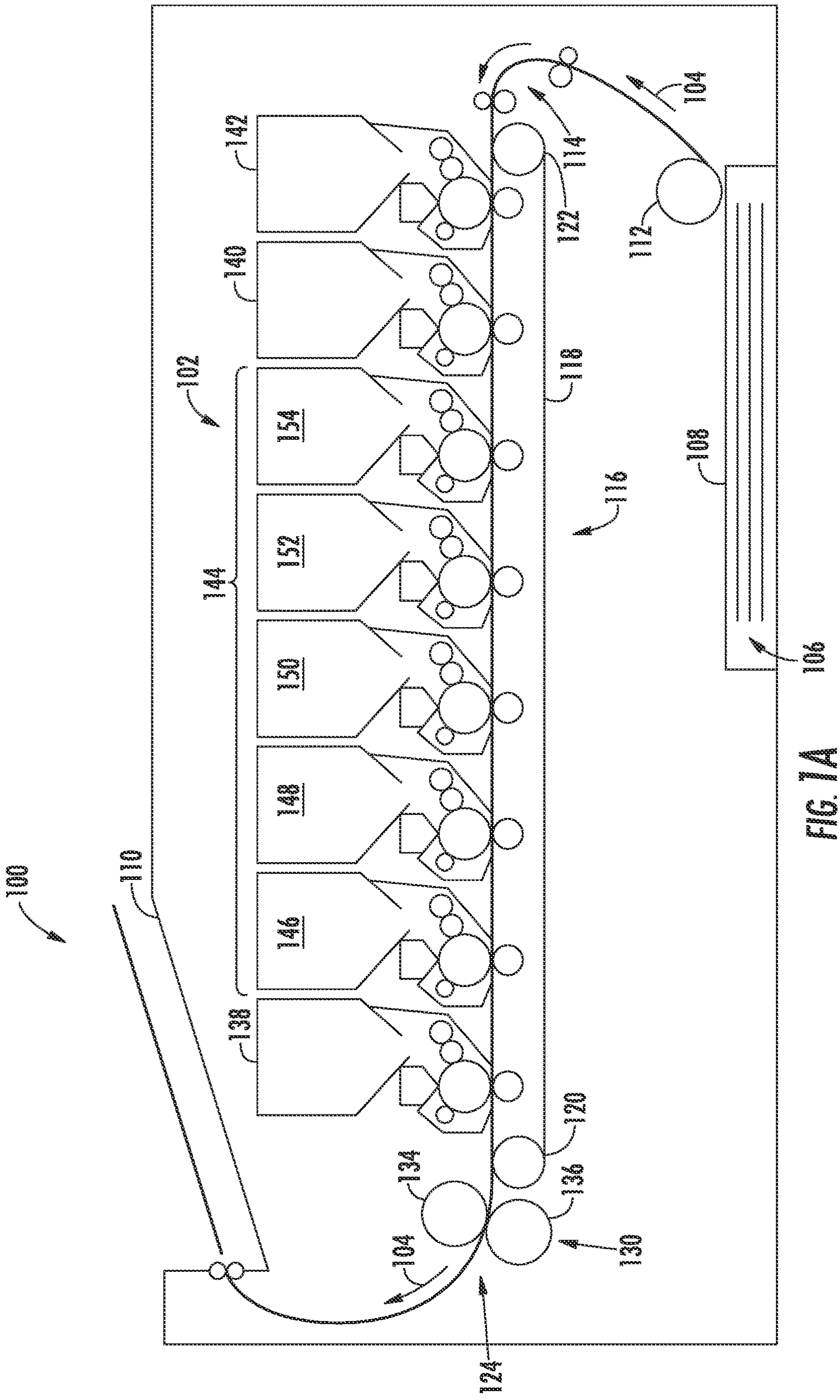
FIGS. 1A-1C schematically show various exemplary electrophotographic printing devices configured for use in accordance with the present disclosure.

Repeat use of reference characters in the present specification and drawings is intended to represent the same or analogous features or elements of the present disclosure.

Definitions

As used herein, the term "activation temperature" refers to the temperature at which a thermoplastic material undergoes sufficient melting to adequately fuse in consideration of the melt behavior and activation requirements of the material, including the melt flow rate of the material. Manufacturers' published data regarding the melt behavior of thermoplastic materials correlate with the activation requirements described herein. It should be noted, however, that in some cases a true glass transition, melting point, or softening point may or may not be an appropriate parameter, depending on the nature of the material, and in some cases it may not be feasible to define one specific temperature at which a thermoplastic material undergoes glass transition, melting, or softening. For example, materials such as polyolefins and waxes, being composed mainly of linear polymeric molecules, generally melt over a relatively narrow temperature range since they are somewhat crystalline below the melting point. Melting points, if not provided by the manufacturer, are readily determined by known methods such as differential scanning calorimetry. Many polymers, and especially copolymers, are amorphous because of branching in the polymer chains or in side-chain constituents. These materials begin to soften and flow more gradually as the temperature is increased. In some instances, the ring and ball softening point of such materials, as determined, for example, by ASTM Test Method E-28, may be useful in predicting activation temperature.

As used herein, the term "fusing time" refers to a period of time during which a plurality of layers of toner particles are exposed to a fusing temperature imparted by a fuser assembly when fusing the layers to a sheet, such as a transfer sheet.

As used herein, the term "fusing temperature" refers to a midpoint temperature of the temperature range across which a plurality of layers of toner particles are fixed onto a sheet, such as a transfer sheet.

As used herein, the term "glass transition" refers to a transition in amorphous regions of a thermoplastic material across a range from a hard, rigid or "glassy" state to a more pliable, compliant, or "rubbery" state.

As used herein, the term "glass transition temperature" refers to the midpoint temperature of the temperature range across which a thermoplastic changes from a hard, rigid or "glassy" state to a more pliable, compliant, or "rubbery" state, based on 100% conversion (full cure), as measured using ASTM E1356, Standard Test Method for Assignment of the Glass Transition Temperature by Differential Scanning calorimetry.

As used herein, the term "heat-transfer time" refers to a period of time during which a plurality of layers of toner particles are exposed to a transfer temperature when heat-transferring the layers to a substrate.

As used herein, the term "melt flow rate" refers to melt mass-flow rate (MFR) and/or melt volume-flow rate (MVR).

As used herein, the term "melt mass-flow rate" or "MFR" refers to the rate of extrusion of a molten thermoplastic, expressed in units of grams per 10 minutes, as measured according to ISO 1133, Determination of the Melt Mass-Flow Rate (MFR) and Melt Volume-Flow Rate (MVR) of Thermoplastics.

As used herein, the term "melt volume-flow rate" or "MVR" refers to the rate of extrusion of a molten thermoplastic, expressed in units of cubic centimeters per 10 minutes, as measured according to ISO 1133, Determination of the Melt Mass-Flow Rate (MFR) and Melt Volume-Flow Rate (MVR) of Thermoplastics.

As used herein, the term "melting temperature" refers to a midpoint temperature of the temperature range across which a thermoplastic material changes from a "solid" state to a liquid state, at atmospheric pressure.

DETAILED DESCRIPTION OF PARTICULAR EMBODIMENTS

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure generally provides methods of transferring an image to a substrate, as well as electrophotographic printing and toner cartridge systems, devices, and kits. Exemplary methods include using an electrophotographic printer to print a plurality of layers of toner particles onto a transfer sheet to form an imaged area and fusing the imaged area in the electrophotographic printer at a fusing temperature applied by a fuser assembly in the printer, then positioning the transfer sheet adjacent to a substrate such that the surface of the transfer sheet with the imaged area faces the substrate and heat-transferring the imaged area to the substrate at a transfer temperature. The transfer sheet is separated from the substrate, leaving the imaged area on the substrate. The plurality of layers of toner particles include one or more colorant layers and an adhesive layer on top of the one or more colorant layers. The adhesive layer adheres the one or more colorant layers to the substrate, such as a production medium, when heat-transferring the imaged area to the substrate. The coating layer provides a protective coating to the one or more colorant layers and may also to adhere the plurality of layers to the substrate when the imaged area is heat-transferred to the substrate.

The one or more colorant layers each include an array of colorant-layer toner particles. The colorant-layer toner particles include a colorant and a colorant-layer thermoplastic adhesive. The adhesive layer includes an array of adhesive-layer toner particles. The adhesive-layer toner particles include an adhesive-layer thermoplastic adhesive. The coating layer includes an array of coating-layer toner particles. The array of coating-layer toner particles includes a coating-layer thermoplastic adhesive, such as one or more cross-linking thermoplastic polymers. The coating layer provide protection to the image after having been heat-transferred to the substrate, which may improve longevity of the heat-transferred image. Additionally, the coating layer may provide a glossy or other aesthetic look to the heat-transferred image.

In some embodiments, the plurality of layers of toner particles may include a release layer as the first layer electrophotographically printed on the sheet. The toner particles of the release layer may include polymeric toner particles, such as a silicone polymer, a polymer selected to form a polymer lattice, and/or one or more polymers selected to form a copolymer lattice. These polymeric toner particles may be fused to the sheet, providing a releasable surface with comparable characteristics of a transfer sheet. The release layer may be printed on an otherwise ordinary coated or uncoated paper, paperboard, or other sheet to provide a releasable surface that allows an otherwise ordinary sheet to function as a transfer sheet.

The plurality of layers of toner particles are fused to a transfer sheet by a fuser assembly in the printer. The fuser assembly may be configured to impart heat and pressure so as to apply a fusing temperature selected to heat the colorant-layer thermoplastic adhesive and/or the adhesive-layer thermoplastic adhesive to a temperature greater than the respective activation temperatures thereof. The melt flow rate of the colorant-layer thermoplastic adhesive(s) may exceed the melt flow rate of the adhesive-layer thermoplastic adhesive, such that when the fuser assembly in the printer heats the respective layers of toner particles, the colorant-layer thermoplastic adhesive(s) exhibit a greater degree of flow and/or dispersion relative to that of the adhesive-layer thermoplastic adhesive. In other embodiments, the melting temperature of the colorant-layer thermoplastic adhesive(s) may exceed the melting temperature of the adhesive-layer thermoplastic adhesive, such that when the fuser assembly in the printer heats the respective layers of toner particles, the colorant-layer thermoplastic adhesive(s) exhibit a greater degree of melt relative to that of the adhesive-layer thermoplastic adhesive. In further embodiments, the fusing temperature of the colorant-layer thermoplastic adhesive(s) may exceed the fusing temperature of the adhesive-layer thermoplastic adhesive. Additionally, or in the alternative, the fusing time may be selected such that the adhesive-layer thermoplastic adhesive and/or the colorant-layer thermoplastic adhesive(s) sufficiently flow and/or disperse within or throughout the respective layers of toner particles, thereby fusing the respective layers of toner particles on the transfer sheet. Conversely, the adhesive-layer thermoplastic adhesive may remain relatively undispersed even though the fusing temperature may be sufficient to heat the adhesive-layer thermoplastic adhesive to a temperature greater than an activation temperature of the adhesive-layer thermoplastic adhesive.

The adhesive-layer thermoplastic adhesive may be subsequently fused to a substrate and the respective layers of toner particles when heat-transferring the imaged area to the substrate. A transfer temperature may be selected for heat-transferring the imaged area to the substrate. The transfer temperature may be selected to as to sufficiently heat the colorant-layer thermoplastic adhesive and/or the adhesive-layer thermoplastic adhesive to a temperature greater than the respective activation temperatures thereof. Additionally, or in the alternative, the heat-transfer time may be selected such that the adhesive-layer thermoplastic adhesive exhibits a sufficient degree of flow and/or dispersion at least partly into the substrate and/or within or throughout the respective layers of toner particles so as to fuse the plurality of layers of toner particles to the substrate and/or to one another.

Additionally, or in the alternative, the fusing temperature may be selected to cause the fuser assembly in the printer to heat the colorant-layer thermoplastic adhesive to a temperature greater than an activation temperature of the colorant-layer thermoplastic adhesive but less than an activation temperature of the adhesive-layer thermoplastic adhesive. The fuser assembly thereby fuses the plurality of layers of toner particles to the transfer sheet and/or to one another, without substantially activating the adhesive-layer thermoplastic adhesive. In some embodiments, the colorant-layer thermoplastic adhesive may fuse to the adhesive-layer thermoplastic adhesive while the adhesive-layer thermoplastic adhesive remains unactivated. The adhesive-layer thermoplastic adhesive may be subsequently activated when heat-transferring the imaged area to a substrate, at which time sufficient heat and pressure are applied to the transfer sheet to heat-transfer the imaged area to the substrate at a suitable transfer temperature.

The present disclosure additionally contemplates methods of electrophotographically printing an image directly on a substrate, such as a production medium. Exemplary methods can include electrophotographically printing a plurality of layers of toner particles onto the substrate to form an imaged area. The plurality of layers of toner particles include an adhesive layer and one or more colorant layers on top of the adhesive layer. The adhesive layer includes an adhesive-layer thermoplastic adhesive, and the one or more colorant layers each include a colorant and a colorant-layer thermoplastic adhesive. The imaged area is fused at a fusing temperature, and the melting temperature, the fusing temperature, or the melt flow rate of the one or more colorant-layer thermoplastic adhesive(s) may exceed the melting temperature, the fusing temperature, or the melt flow rate of the adhesive-layer thermoplastic adhesive.

In some embodiments, the imaged area may be fused at a first fusing temperature, followed by a second fusing temperature. The first fusing temperature may be selected to heat the imaged area to a temperature greater than an activation temperature of the one or more colorant-layer thermoplastic adhesive(s), but less than an activation temperature of the adhesive-layer thermoplastic adhesive. The second fusing temperature may be selected to heat the adhesive-layer thermoplastic adhesive to greater than the activation temperature of the adhesive-layer thermoplastic adhesive, thereby causing the adhesive-layer thermoplastic adhesive to fuse and adhere to the substrate.

The present disclosure additionally embraces electrophotographic printing systems and devices. An electrophotographic printing system or device may include an electrophotographic printing device, optionally with one or more electrophotographic toner cartridges installed therein. An exemplary electrophotographic printing system or device may include, one or more photoconductor drums, one or more fuser assemblies, one or more transfer assemblies, and one or more toner cartridges. Exemplary electrophotographic printing systems and devices may include a photoconductor drum configured to operably engage with an electrophotographic toner cartridge, and a transfer assembly operably configured to transport a sheet past the photoconductor drum. A photoconductor drum may be incorporated into a toner cartridge, or a photoconductor drum may be provided separately from a toner cartridge. The photoconductor drum carries a latent electrostatic image formed by light irradiation from an exposure device, and an array of toner particles cling to the latent electrostatic image as the photoconductor drum rotates in cooperation with the electrophotographic toner cartridge. The transfer assembly transports the sheet past the photoconductor drum, and the array of toner particles transfer from the photoconductor drum to the sheet.

Exemplary electrophotographic printing systems and devices additionally include a fuser assembly operably configured to apply heat and pressure to an array of toner particles on the sheet at a fusing temperature. The fusing temperature may be selected to heat the array of toner particles on the sheet to greater than an activation temperature of one or more colorant-layer thermoplastic adhesive(s) and/or greater than an activation temperature of an adhesive-layer thermoplastic adhesive. In some embodiments, the fusing temperature may be selected to heat the array of toner particles on the sheet to greater than an activation temperature of the one or more colorant-layer thermoplastic adhesive(s), but less than an activation temperature of the adhesive-layer thermoplastic adhesive.

Exemplary electrophotographic toner cartridges may include one or more toner cartridges configured to print a coating layer, one or more toner cartridges configured to print an adhesive-layer, and one or more toner cartridges configured to print a release layer. The one or more toner cartridges may be pre-installed, or provided in a cartridge kit or separately. A toner cartridge configured to print a coating layer includes a toner container and a supply of toner particles including an adhesive-layer thermoplastic adhesive housed therein. A toner cartridge configured to print a coating-layer may contain a supply of toner particles that includes one or more crosslinking thermoplastic polymers. A toner cartridge configured to print a release layer contains a supply of polymeric toner particles. The polymeric toner particles may include as a silicone polymer, a polymer selected to form a polymer lattice, and/or one or more polymers selected to form a copolymeric lattice.

An electrophotographic toner cartridge kit may include a selection of toner cartridges for printing an imaged area on a sheet such as a transfer sheet. The selection of toner cartridges may include one or more toner cartridge configured to print a coating layer, one or more toner cartridge configured to print an adhesive-layer, one or more toner cartridge configured to print a release layer, and/or one or more toner cartridges configured to print a colorant layer. The colorant layer may include one or more of a cyan colorant, a magenta colorant, a yellow colorant, a black colorant, and a white colorant.

The presently disclosed electrophotographic printing methods, devices, systems, and kits provide for a weeded imaged area to be transferred directly from a transfer sheet to a substrate, or for a weeded imaged area to be printed directly on a production medium. These methods, devices, systems, and kits allow users to produce customized weeded images on substrates without the need to cut around the printed areas to remove the coating from the extraneous, non-printed areas of the transfer sheet, and without transferring an undesirable background coating to the substrate. Additionally, the presently disclosed methods do not require an adhesive transfer sheet because the adhesive-layer thermoplastic adhesive is electrophotographically printed, either on the transfer sheet or directly onto the production medium. As such, the number of steps required of users is streamlined or reduced. Additionally, the amount of waste material is reduced with the present disclosure relative to other known alternatives, at least because the present disclosure provides for transferring an image to a substrate without requiring an adhesive transfer sheet and/or because the present disclosure provides for electrophotographically printing directly onto a production medium without requiring any transfer sheet.

Moreover, since no cutting or weeding is required, nearly anyone having an electrophotographic printer can utilize the presently disclosed methods, devices, systems, and kits to produce their own customized images for heat transfer to a substrate and/or for directly printing onto a substrate. Thus, many users that are not currently able to utilize heat transfer methods for applying an image to a substrate can now produce customized images on substrates with their own images in a more streamlined process and without generating as much waste material.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other. Approximating language, as used herein throughout the specification and claims, is applied to modify any quantitative representation that could permissibly vary without resulting in a change in the basic function to which it is related. Accordingly, a value modified by a term or terms, such as “about”, “approximately”, and “substantially”, are not to be limited to the precise value specified. In at least some instances, the approximating language may correspond to the precision of an instrument for measuring the value, or the precision of the methods or machines for constructing or manufacturing the components and/or systems.

Various embodiments of the present disclosure will now be described in greater detail.

Printing Devices

Figure 1B:
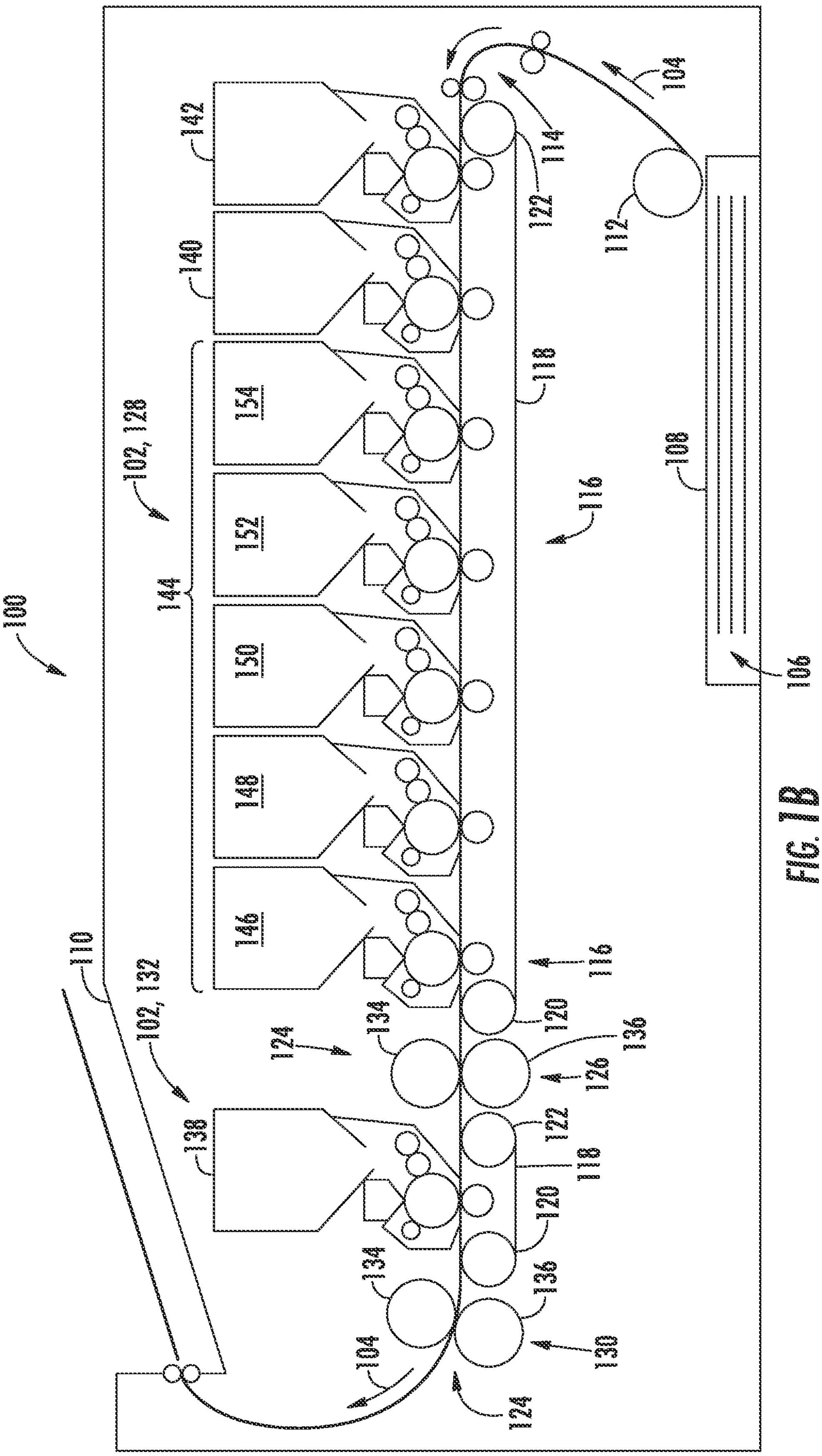
Figure 1C:
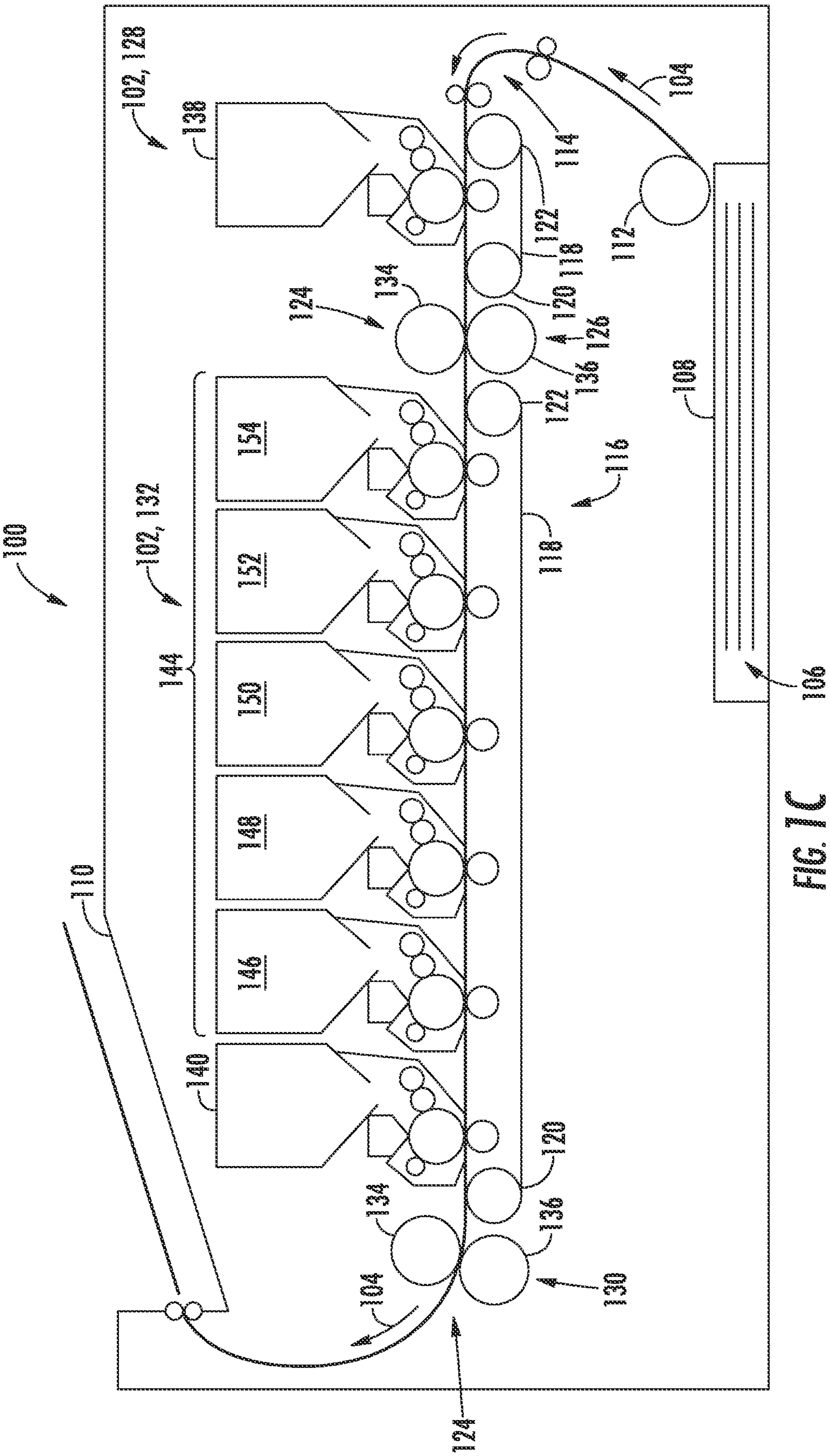

Exemplary electrophotographic printing devices are shown in FIGS. 1A-1C. For convenience, an electrophotographic printing device will sometimes be referred to herein as a “printer.” The various configurations of the exemplary printers shown in FIGS. 1A-1C are intended to illustrate exemplary embodiments of the present disclosure, and are not to be taken in a limiting sense. It is to be appreciated that a printer may be configured in numerous other ways without departing from the spirit and scope of the present disclosure, and it is intended that other electrophotographic printing device, and other aspects, features, and embodiments thereof, are within the spirit and scope of the present disclosure. As shown in FIG. 1A, an exemplary electrophotographic printing device or printer 100 may include one or more electrophotographic toner cartridges 102 that can print an array of toner particles on a sheet such as a transfer sheet. For convenience, an electrophotographic toner cartridge will sometimes be referred to herein as a “toner cartridge.”

The one or more toner cartridges are disposed along a media path 104, which may include various rollers, belts, and the like configured to transport a sheet 106 such as a transfer paper from a feeding cassette 108 to an ejection tray 110. In some embodiments, a feeder roller 112 extracts the sheet from the cassette 108 and transports the sheet 106 to a plurality of carrying rollers 114, which correct skew of the sheet 106 and transport the sheet 106 to a transfer unit 116. The transfer unit 116 may include one or more endless transfer belts 118, one or more drive rollers 120 that rotate under power from a drive motor (not shown) and one or more tension rollers 122 under tension from a spring mechanism (not shown), which together rotate the one or more endless transfer belts 118.

An exemplary printer 100 includes one or more fuser assemblies 124 disposed downstream from at least some of the one or more toner cartridges 102. For example, as shown in FIG. 1A, a printer 100 may include a first fuser assembly 126 disposed downstream from a plurality of toner cartridges 102. Alternatively, as shown in FIGS. 1B and 1C, an exemplary electrophotographic printing device 100 may include a first fuser assembly 126 disposed downstream from a first one or more toner cartridges 128 and a second fuser assembly 130 disposed downstream from a second one or more toner cartridges 132. An exemplary fuser assembly 124 includes a heat application roller 134 and a pressure roller 136. The heat application roller 134 and the pressure roller 136 operate based on control logic provided by a computer processor (not shown) that includes a fuser control module. A temperature sensor (not shown) detects a surface temperature of the heat application roller, and the fuser control module causes a heater (FIG. 2) within or operably coupled to the heat application roller 134 to apply heat to control the surface temperature of the heat application roller 134 at a desired fusing temperature. The pressure roller 136 is positioned against the heat application roller 134 with a desired pressure, such that the fuser assembly 124 imparts the desired fusing temperature and pressure to the sheet 106 passing therethrough. The fuser assembly 124 thereby fuses the toner particles printed by the toner cartridges 102 as described herein.

Figure 2:
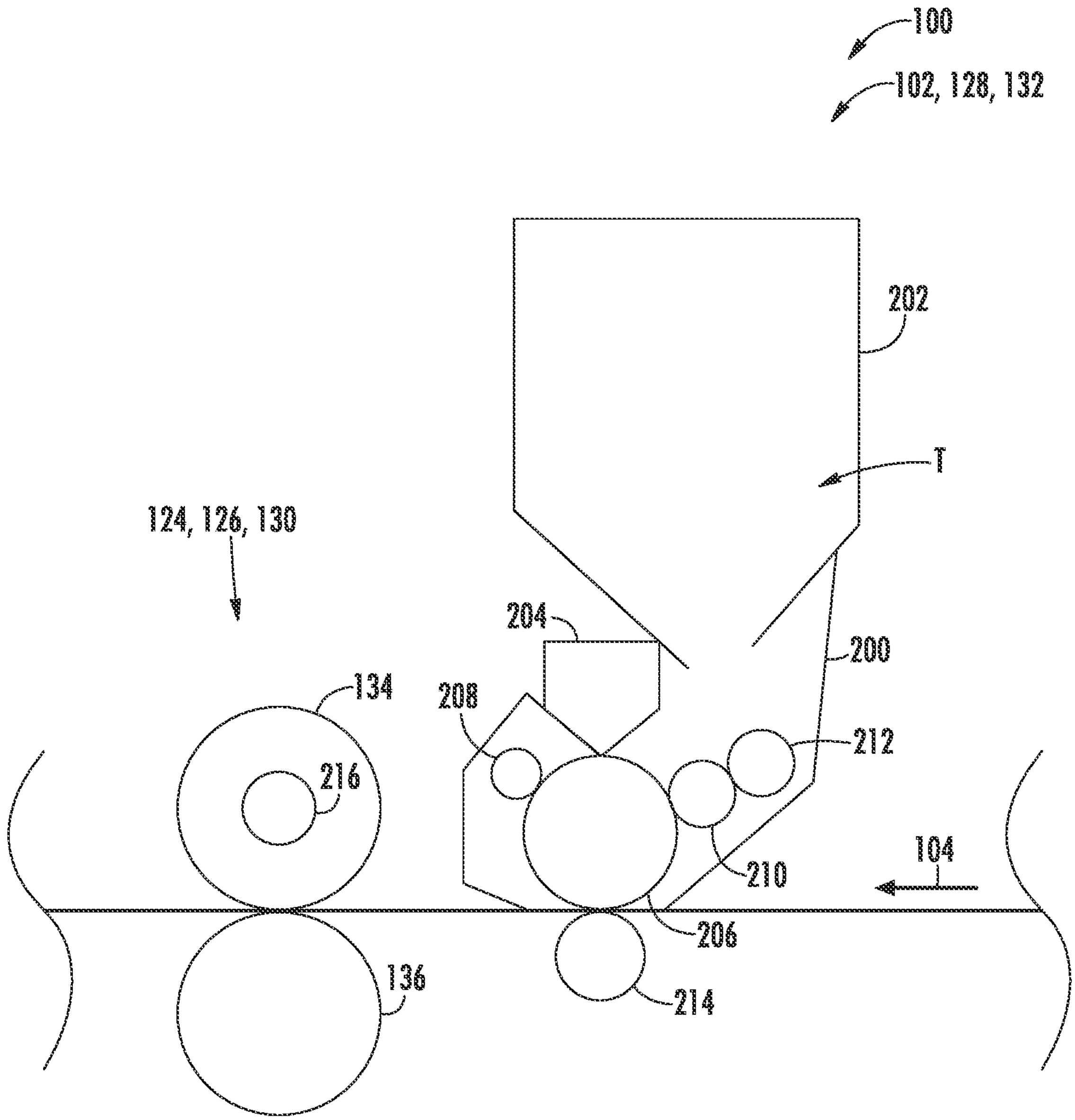
FIG. 2 schematically shows an enlarged view of an exemplary electrophotographic printing cartridge which may be used in one of the exemplary electrophotographic printing devices of FIGS. 1A-1C.
Figure 3:
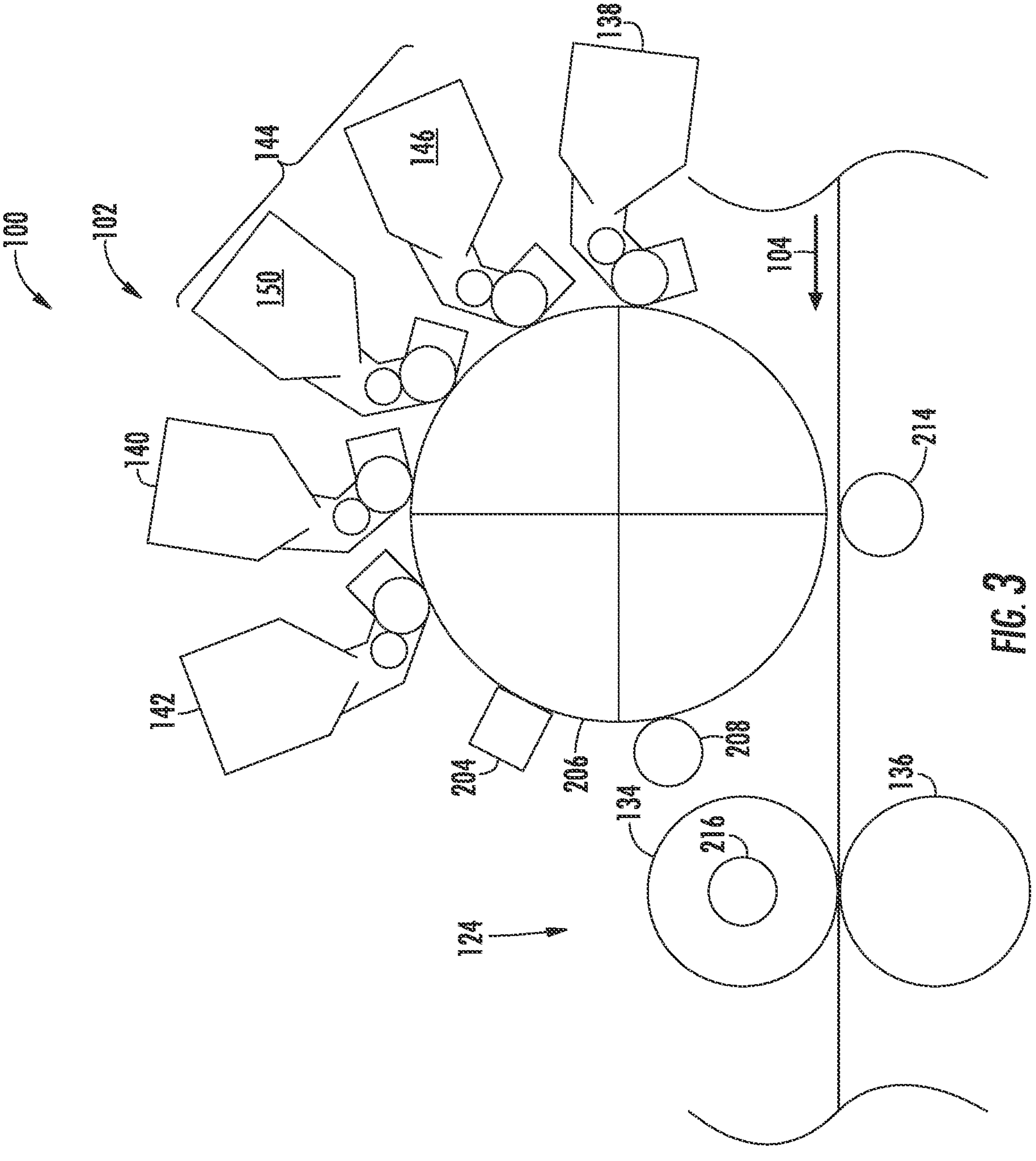
FIG. 3 schematically shows an enlarged view of another exemplary electrophotographic printing device that has a single photoconductor drum configured for use in accordance with the present disclosure.

An exemplary electrophotographic toner cartridge 200 is shown in FIG. 2. It is to be appreciated that an electrophotographic toner cartridge may be configured in numerous other ways without departing from the spirit and scope of the present disclosure. The exemplary toner cartridge 200 shown in FIG. 2 is not to be taken in a limiting sense, and it is intended that other electrophotographic toner cartridges, and other aspects, features, and embodiments thereof, are within the spirit and scope of the present disclosure. As shown in FIG. 2, an exemplary toner cartridge 200 may include a toner container 202 and a supply of toner particles T. In some embodiments, the toner cartridge 200 includes an exposure device 204 and a photoconductor drum 206. The exposure device 204 may be a laser, an LED, or the like. Alternatively, as shown in FIG. 3, an exposure device 204 and photoconductor drum 206 may be provided separately from, and configured to operate in cooperation with, one or more toner cartridges 102. The exemplary toner cartridge 200 includes a charging roller 208, which imparts an electrostatic charge to the photoconductor drum 206, and a development roller 210 that applies an array of toner particles to the photoconductor drum 206.

As the photoconductor drum 206 rotates, the charging roller 208 imparts an electrostatic charge to the surface of the photoconductor drum 206. The exposure device 204 directs a beam of light onto the charged surface of the photoconductor drum 206, which neutralizes or reverses the charge on the portion of the surface contacted by the beam of light, thereby providing a latent electrostatic image on the surface of the photoconductor drum 206. The toner particles T inside the toner container 202 have a negative charge. The development roller 210 is coated with a layer of toner particles T by a supply roller 212. The layer of negatively charged toner particles T on the development roller 210 are electrostatically attracted to the latent electrostatic image on the photoconductor drum 206, thereby providing an array of toner particles on the on the photoconductor drum 206 corresponding to the latent electrostatic image formed by the exposure device 204. The negatively charged toner particles do not adhere to the photoconductor drum 206 in the areas where the negative charge imparted by the charge roller 208 remains.

The array of toner particles on the photoconductor drum 206 are transferred to a sheet 106, which may be transported between the photoconductor drum 206 and a transfer roller 214 by the transfer unit 116. The transfer roller 214 may carry a positive charge to help transfer the array of toner particles from the photoconductor drum 206 to the sheet 106. The sheet with the array of toner particles transferred thereon passes through the fuser assembly 124, between the heat application roller 134 and the pressure roller 126. The heat application roller 134 includes a heater 216 such as a radiant heat lamp disposed therein and configured to uniformly heat the surface of the heat application roller 134 to a desired temperature. The array of toner particles are subjected to heat and pressure by the fuser assembly 124, thereby fusing the toner particles at a fusing temperature.

Referring again to FIGS. 1A-1C, an exemplary printer 100 may include a plurality of toner cartridges 102 configured as described herein. The toner cartridges 102 may be detachably coupled to the printer 100. In this manner, various toner cartridges may be interchanged to provide desired printing configurations. In some embodiments, an electrophotographic toner cartridge kit may be utilized. The kit may include a selection of toner cartridges for printing an imaged area on a sheet such as a transfer sheet. The plurality of toner cartridges 102, whether provided in a kit or otherwise, may include an adhesive-layer toner cartridge 138 configured to print an adhesive layer, a coating-layer toner cartridge 140 configured to print a coating-layer, and/or a release-layer toner cartridge 142 configured to print a release layer. Additionally, the plurality of toner cartridges 102, whether provided in a kit or otherwise, may include one or more colorant-layer toner cartridges 144 configured to print a colorant layer. The one or more colorant-layer toner cartridges may include one or more of a cyan-colorant toner cartridge 146, a magenta colorant-toner cartridge 148, a yellow-colorant toner cartridge 150, a black-colorant toner cartridge 152, and a white-colorant toner cartridge 154. Additionally, in some embodiments one or more of the plurality of toner cartridges 102 shown may be omitted, and/or other toner cartridges may be added in accordance with the present disclosure.

The plurality of toner cartridges 102 may be configured and arranged in any desired order or combination and for printing on any desired sheet. For example, when printing an imaged area that has a plurality of layers, the plurality of toner cartridges may be arranged in an order corresponding to the order of the desired layers in the imaged area. It will be appreciated that when printing to a transfer sheet, the layers of the imaged area on the transfer sheet will be reversed, so that the layers of the imaged area will be in the desired order when the imaged area is transferred to a production medium. As such, the layers of the printed image may be printed on the transfer sheet in the opposite order from how they will be layered on the production medium. On the other hand, when printing directly to a production medium the layers of the imaged area will be printed in their desired order in the first place.

When printing on a transfer sheet, an imaged area may be formed by first printing one or more colorant layers, followed by an adhesive layer. The adhesive layer will be the top layer or the last layer printed on the transfer sheet, as the adhesive layer will be the layer which contacts and adheres to the production medium when the imaged area is transferred from the transfer sheet to the production medium. A coating layer and/or a release layer may be printed on the transfer sheet prior to the one or more colorant layers. The release layer may be electrophotographically printed onto the transfer sheet, and the coating layer may be printed between the release layer and the one or more colorant layers. Alternatively, the coating layer may be electrophotographically printed onto a transfer sheet, such as a transfer sheet that already has a release layer printed thereon or otherwise has surface to which a coating layer will not stick when transferring the imaged area from the transfer sheet to a production medium.

When printing directly on a production medium, an imaged area may be formed by first printing an adhesive layer, followed by one or more colorant layers. The adhesive layer will be the bottom layer or the first layer printed on the production medium, as the adhesive layer will be the layer which adheres to the production medium. Additionally, a coating layer may be printed to the production medium, on top of the one or more colorant layers.

As shown in FIG. 1A, the plurality of toner cartridges 102 are shown installed in the printer 100 in an order intended for printing on a transfer sheet. To print directly on a production medium, the cartridges shown in FIG. 1A may simply be installed in the reverse order. FIG. 1B similarly shows a plurality of toner cartridges 102 installed in the printer 100 in an order intended for printing on a transfer sheet. Conversely, FIG. 1C shows a plurality of toner cartridges 102 installed in the printer 100 in an order intended for printing directly on a production medium.

While FIG. 1A shows the printer 100 with one fuser assembly 126, it is to be appreciated that any number of fuser assemblies may be provided, downstream or upstream from any one or more of the toner cartridges 102. For example, the printer 100 shown in FIGS. 1B and 1C includes multiple fuser assemblies. The printer 100 shown in FIG. 1B includes a first fuser assembly 126 disposed downstream from a first one or more toner cartridges 128 and a second fuser assembly 130 disposed downstream from a second one or more toner cartridges 132. The first fuser assembly 126 is disposed downstream from the one or more colorant-layer toner cartridges 144 and upstream from the adhesive-layer toner cartridge 138. The first fuser assembly 126 is also downstream from the coating-layer toner cartridge 140, and/or the release-layer toner cartridge 142, both of which are disposed upstream from the one or more colorant-layer toner cartridges 144. The second fuser assembly 130 is disposed downstream from the adhesive-layer toner cartridge 138.

In the printer 100 shown in FIG. 1B, the first fuser assembly 126 may be configured to fuse the array of toner particles printed by the one or more colorant-layer toner cartridges 144, and/or the array of toner particles printed by the coating-layer toner cartridge 140, and/or the release-layer toner cartridge 142 at a first fusing temperature. The colorant-layer toner particles may include a colorant and a colorant-layer thermoplastic adhesive, and the first fusing temperature may be selected to heat the colorant-layer thermoplastic adhesive to greater than an activation temperature of the colorant-layer thermoplastic adhesive. The coating-layer toner particles may include a crosslinking thermoplastic polymer, and the first fusing temperature may be selected to heat the crosslinking thermoplastic polymer of the coating layer to greater than an activation temperature of the crosslinking thermoplastic polymer. The release-layer toner may include a supply of polymeric toner particles, and the first fusing temperature may be selected to heat the polymeric toner particles of the release layer to greater than an activation temperature of the polymeric toner particles.

The second fuser assembly 130 may be configured to at least partially fuse the array of toner particles printed by the adhesive-layer toner cartridge 138 at a second fusing temperature. For example, the array of toner particles in the adhesive layer may include an adhesive-layer thermoplastic adhesive, and the second fuser assembly 130 may be configured to heat the adhesive-layer thermoplastic adhesive to greater than an activation temperature of the adhesive-layer thermoplastic adhesive. Additionally, the second fuser assembly 130 may be configured to further fuse the array of toner particles printed by the one or more colorant-layer toner cartridges 144, the coating-layer toner cartridge 140, and/or the release-layer toner cartridge 142, such that these layers are fused in part by the first fuser assembly 126 and in part by the second fuser assembly 130.

The printer 100 shown in FIG. 1C also includes a first fuser assembly 126 disposed downstream from a first one or more toner cartridges 128 and a second fuser assembly 130 disposed downstream from a second one or more toner cartridges 132. The printer 100 shown in FIG. 1C is configured to print directly on a substrate, such as a production medium. As such, the toner cartridges are provided in reverse order relative to a printer configured to print on a transfer medium as shown in FIGS. 1A and 1B. As shown in FIG. 1C, the first fuser assembly 126 is disposed downstream from the adhesive-layer toner cartridge 138, and the second fuser assembly 130 is disposed downstream from the one or more colorant-layer toner cartridges 144 and the coating-layer toner cartridge 140. The first fuser assembly 126 may be configured to partially fuse the array of toner particles printed by the adhesive-layer toner cartridge 138 at a first fusing temperature. For example, the array of toner particles in the adhesive layer may include an adhesive-layer thermoplastic adhesive, and the first fuser assembly 130 may be configured to heat the adhesive-layer thermoplastic adhesive to greater than an activation temperature of the adhesive-layer thermoplastic adhesive but with a fusing time that is less than the time necessary to fully fuse the adhesive-layer thermoplastic adhesive.

The second fuser assembly 130 may be configured to fuse at a second fusing temperature, the array of toner particles printed by the one or more colorant-layer toner cartridges 144, and/or the array of toner particles printed by the coating-layer toner cartridge 140, and/or the release-layer toner cartridge 142. Additionally, the second fuser assembly 130 may be configured to further fuse the array of toner particles printed by the adhesive-layer toner cartridge 138. For example, the second fuser assembly 130 may heat the adhesive-layer thermoplastic adhesive to greater than the activation temperature of the adhesive-layer thermoplastic adhesive, thereby activating the adhesive-layer thermoplastic adhesive and providing additional fusing time to further fuse and adhere the imaged area to the production medium. In some embodiments, the first fuser assembly may activate the adhesive-layer thermoplastic adhesive so as to hold the adhesive-layer thermoplastic adhesive in place while the subsequent layers of toner particles are printed. Then, the second fuser may activate the one or more colorant-layer thermoplastic adhesive(s) and/or other subsequent layers of toner particles (e.g., coating-layer toner particles), as well as the adhesive-layer thermoplastic adhesive, thereby allowing the adhesive-layer thermoplastic adhesive to further fuse and adhere to both the substrate and the colorant-layer toner particles and/or other subsequent layers of toner particles.

Referring now to FIG. 3, in some embodiments, a printer 100 may include an exposure device 204 and photoconductor drum 206 provided separately from one or more toner cartridges 102. The photoconductor drum operates similarly to the operations described above with respect to FIG. 2, except that the plurality of toner cartridges 102 utilize the same photoconductor drum 206. As such, in the embodiment shown in FIG. 3, the exposure device sequentially produces the latent electrostatic image for each of the plurality of toner cartridges 102, and the transfer unit 116 is configured to sequentially re-route the sheet past the photoconductor drum 206 so that the sequential layers of the imaged area may be transferred to the sheet. In some embodiments, one or more of the layers of the imaged area may be sequential fused by the fuser assembly 124 between sequential passes of the sheet 106 by the photoconductor drum 206.

The plurality of toner cartridges 102 may include an adhesive-layer toner cartridge 138, a coating-layer toner cartridge 140, a release-layer toner cartridge 142, and a plurality of colorant-layer toner cartridges 144. As shown, the plurality of colorant-layer toner cartridges 144 includes a yellow-colorant toner cartridge 150, and a white-colorant toner cartridge 154; however, additional or different colorant-layer toner cartridges also may be provided such that one or more of the plurality of toner cartridges 102 shown may be omitted, and/or other toner cartridges may be added.

In the embodiment shown in FIG. 3, the fuser assembly 124 may be configured to fuse the sequential layers of the imaged area at different fusing temperatures. For example, the fuser assembly 124 may be configured to at least partially fuse a first layer of an imaged area at a first fusing temperature and to at least partially fuse a second layer of an imaged area at a second fusing temperature. The fuser assembly 124 may be configured to fuse at a first fusing temperature, the array of toner particles printed by the one or more colorant-layer toner cartridges 144, and/or the array of toner particles printed by the coating-layer toner cartridge 140, and/or the release-layer toner cartridge 142. The fuser assembly 124 may be configured to fuse at a second fusing temperature, the array of toner particles printed by the adhesive-layer toner cartridge 138.

Toner Cartridges

The exemplary printers 100 described herein may be used to print to a sheet 106 such as a transfer paper using any combination of toner cartridges. The toner cartridges may include an adhesive-layer toner cartridge, a coating-layer toner cartridge, a release-layer toner cartridge, and one or more colorant-layer toner cartridges. One or more toner cartridges may be preinstalled in the printer 100, or may be provided in a kit or separately for a user to install in a printer 100. Exemplary toner cartridges include a toner container and a supply of toner particles.

The supply of toner particles in an adhesive-layer toner cartridge includes an adhesive-layer thermoplastic adhesive. The adhesive-layer thermoplastic adhesive may consist of particles that are from about 2 to about 50 micrometers in diameter. The melt volume-flow rate of the adhesive-layer thermoplastic adhesive may range between about 10 to 200 $cm^3$/10 min, at 160° C./2.16 kG, such as from 50 to 100 $cm^3$/10 min. The glass transition temperature of the adhesive-layer thermoplastic adhesive may range from about −20° C. to 50° C., such as from about 0° C. to 20° C. The adhesive-layer thermoplastic adhesive may be any thermoplastic adhesive that meets the criteria set forth herein. For example, suitable thermoplastic adhesives include polyamides, polyesters, ethylene vinyl acetate copolymers, polyolefins, polyurethanes, epoxies, and so forth.

The colorant-layer toner particles include a colorant and a colorant-layer thermoplastic adhesive. The colorant may be a cyan colorant, a magenta colorant, a yellow colorant, a black colorant, or a white colorant. Exemplary colorants include carbon black, nigrosine dyes, iron black, Naphthol Yellow S, Hansa Yellow (10G, 5G, G), cadmium yellow, yellow iron oxide, yellow ocher, chrome yellow, Titan Yellow, Polyazo Yellow, Oil Yellow, Hansa Yellow (GR, A, RN, R), Pigment Yellow L, Benzidine Yellow (G, GR), Permanent Yellow (NCG), Vulcan Fast Yellow (5G, R), Tartrazine Lake, Quinoline Yellow Lake, anthracene yellow BGL, isoindolinone yellow, coloothar, red lead oxide, lead red, cadmium red, cadmium mercury red, antimony red, Permanent Red 4R, Para Red, Fire Red, parachlororthonitroaniline red, Lithol Fast Scarlet G, Brilliant Fast Scarlet, Brilliant Carmine BS, Permanent Red (F2R, F4R, FRL, FRLL, F4RH), Fast Scarlet VD, Vulcan Fast Rubine B, Brilliant Scarlet G, Uthol Rubine GX, Permanent Red FSR, Brilliant Carmine 6B, Pigment Scarlet 3B, Bordeaux 5B, Toluidine Maroon, Permanent Bordeaux F2K, Helio Bordeaux BL, Bordeaux 10B, BON Maroon Light, BON Maroon Medium, eosine lake, Rhodamine Lake B, Rhodamine Lake Y, Alizarine Lake, Thioindigo Red B, Thioindigo Maroon, Oil Red, quinacridone red, Pyrazolone Red, Polyazo Red, Chrome Vermilion, Benzidine Orange, Perynone Orange, Oil Orange, cobalt blue, cerulean blue, Alkali Blue Lake, Peacock Blue Lake, Victoria Blue Lake, metal-free phthalocyanine blue, Phthalocyanine Blue, Fast Sky Blue, Indanthrene Blue (RS, BC), indigo, ultramarine, Prussian blue, Anthraquinone Blue, Fast Violet B, Methyl Violet Lake, cobalt violet, manganese violet, dioxazine violet, Anthraquinone Violet, chrome green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc white, and lithopone, and combinations these.

The colorant-layer thermoplastic adhesive may consist of particles that are from about 2 to about 50 micrometers in diameter. The thermoplastic adhesives used in the different layers of toner particles may exhibit different melt behaviors, including different activation temperatures and/or different melt flow rates as between respective thermoplastic adhesives. For example, in some embodiments, the melt flow rate (i.e., melt volume-flow rate and/or melt-mass flow rate) of a colorant-layer thermoplastic adhesive may exceed the melt flow rate of an adhesive-layer thermoplastic adhesive. In some embodiments, it may be desirable for the melt flow rate of the colorant-layer thermoplastic adhesive to vastly exceed the melt flow rate of the adhesive-layer thermoplastic adhesive. For example, the melt volume-flow rate of the colorant-layer thermoplastic adhesive may exceed the melt volume-flow rate of the adhesive-layer thermoplastic adhesive by from 1% to 1,000% at 160° C./2.16 kG, such as from 1% to 100%, such as from 5% to 100%, such as 10% to 100%, such as 20% to 100%, such as 40% to 100%, such as 60% to 100%, such as 80% to 100%, such as from 50% to 100%, such as from 50% to 500%, such as from 50% to 100%, such as from 100% to 500%, such as from 500% to 1,000%. The melt volume-flow rate of a colorant-layer thermoplastic adhesive may exceed the melt volume-flow rate of an adhesive-layer thermoplastic adhesive by 5% or more, such as 10% or more, 25% or more, such as 50% or more, such as 75% or more, such as 100% or more, such as 250% or more, such as 500% or more, such as 750% or more. The melt volume-flow rate of a colorant-layer thermoplastic adhesive may exceed the melt volume-flow rate of an adhesive-layer thermoplastic adhesive by 750% or less, such as 500% or less, such as 250% or less, such as 100% or less, such as 75% or less, such as 50% or less, such as 25% or less, such as 10% or less, such as 5% or less. The adhesive-layer thermoplastic adhesive may be any thermoplastic adhesive that meets the criteria set forth herein. For example, suitable thermoplastic adhesives include polyamides, polyesters, ethylene vinyl acetate copolymers, polyolefins, polyurethanes, and so forth.

In some embodiments, when electrophotographically printing an array of adhesive-layer toner particles onto a sheet, it is desirable that the adhesive-layer thermoplastic adhesive not be prematurely activated. For example, when electrophotographically printing an imaged area including an adhesive layer to a transfer sheet, it is desirable to fuse the various layers of the imaged area to the transfer sheet and/or to one another, without substantially activating the adhesive-layer thermoplastic adhesive. Then, the adhesive-layer thermoplastic adhesive may be activated when transferring the imaged area to a production medium. To avoid premature activation of the adhesive-layer thermoplastic adhesive, the adhesive-layer thermoplastic adhesive may be selected so as to have an activation temperature that exceeds the activation of the one or more colorant-layer thermoplastic adhesive(s). As such, the one or more colorant-layer thermoplastic adhesive(s) in the imaged area may be activated when fusing the imaged area to the transfer sheet, and then the adhesive-layer thermoplastic adhesive may then be activated and fused when transferring the imaged area to the production medium.

In some embodiments, the activation temperature of the adhesive-layer thermoplastic adhesive may exceed the activation temperature of a colorant-layer thermoplastic adhesive. For example, the activation temperature of an adhesive-layer thermoplastic adhesive may exceed the activation temperature of a colorant-layer thermoplastic adhesive by about 0.1 to 50° C., such as from 0.1 to 25° C., such as from 0.1 to 15° C., such as from 0.1 to 10° C., such as from 0.1 to 5° C., such as from 0.1 to 1° C. The activation temperature of the adhesive-layer thermoplastic adhesive may exceed the activation temperature of a colorant-layer thermoplastic adhesive by 0.1° C. or more, such as 1° C. or more, such as 5° C. or more, such as 10° C. or more, such as 15° C. or more, such as 25° C. or more, such as 35° C. or more. The activation temperature of the adhesive-layer thermoplastic adhesive may exceed the activation temperature of a colorant-layer thermoplastic adhesive by 50° C. or less, such as 40° C. or less, such as 25° C. or less, such as 15° C. or less, such as 10° C. or less, such as 5° C. or less, such as 1° C. or less, such as 0.1° C. or less.

In some embodiments, the glass transition temperature of an adhesive-layer thermoplastic adhesive may exceed the glass transition temperature of a colorant-layer thermoplastic adhesive by about 0.1° C. to 50° C., such as from 0.1° C. to 25° C., such as from 0.1° C. to 5° C., such as from 0.1° C. to 10° C., such as from 1° C. to 50° C., such as from 5° C. to 25° C., such as from 10° C. to 25° C., such as from 10° C. to 50° C., such as from 25° C. to 50° C., such as from 35° C. to 50° C. The glass transition temperature of the adhesive-layer thermoplastic adhesive may exceed the glass transition temperature of the colorant-layer thermoplastic adhesive by 0.1° C. or more, such as 1° C. or more, such as 5° C. or more, such as 10° C. or more, such as 25° C. or more, such as 35° C. or more, such as 40° C. or more. The glass transition temperature of the adhesive-layer thermoplastic adhesive may exceed the glass transition temperature of the colorant-layer thermoplastic adhesive by 50° C. or less, such as 40° C. or less, such as 35° C. or less, such as 25° C. or less, such as 10° C. or less, such as 5° C. or less, such as 1° C. or less. On the other hand, in some embodiments, the glass transition temperature of the colorant-layer thermoplastic adhesive may exceed the glass transition temperature of the adhesive-layer thermoplastic adhesive.

The toner particles in a coating-layer toner cartridge may include a crosslinking thermoplastic polymer or polymers, such as polyamides, polyesters, ethylene vinyl acetate copolymers, polyolefins, polyurethanes, and so forth. The release-layer toner cartridge includes a supply of polymeric toner particles, such as a silicone polymer, a polymer selected to form a polymer lattice, and/or one or more polymers selected to form a copolymeric lattice. Exemplary polymers that may form a polymer lattice include acrylics, a polyvinylacetates, polystyrenes, polyvinyl alcohols, polyurethanes, and polyvinylchlorides. Exemplary polymers that may form a copolymeric lattice include ethylene-vinylacetate copolymers, acrylic copolymers, vinyl chloride-acrylics, and vinylacetate acrylics. In some embodiments, an electrophotographic toner cartridge may include additional ingredients, including release agents, charge controlling agents, fluidity improving agents, cleanability improving agents, magnetic materials, and/or soaps. In some embodiments, the supply of toner particles may include polymerized toner particles.

Printing Methods

Figure 4A:
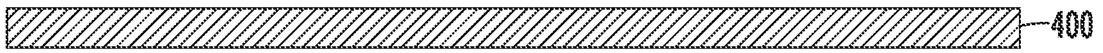
FIG. 4A schematically shows an exemplary sheet, such as a transfer sheet.

Methods of electrophotographically printing to a sheet and methods of transferring an image to a substrate will now be discussed. Exemplary methods may be performed using any suitable sheet as a transfer sheet. FIG. 4A shows an exemplary sheet 400, which may be a transfer sheet. Exemplary transfer sheets are commercially available from Neenah, Inc. (Alpharetta, Ga.). Such transfer sheets may include a specially formulated release layer applied on a base layer of the substrate. The release layer includes a surface to which fused layers of an electrophotographically printed imaged area do not stick at transfer temperatures, thereby allowing the imaged area to readily transfer to a production medium. Additionally, a transfer sheet may include a conforming layer between the base layer and the release layer. Alternatively, in some embodiments an otherwise ordinary, coated or uncoated paper sheet may be used as a transfer sheet in accordance with the present disclosure, and a release layer may be electrophotographically printed on the sheet together with the layers of the image area. An imaged area may be electrophotographically printed on a transfer sheet, and then transferred to a production medium such as T shirts, sweat shirts, hats, banners, leather goods, and the like. Alternatively, an imaged area may be electrophotographically printed directly on production medium. Exemplary production medium substrates include woven or nonwoven articles formed from natural or synthetic fibers or films, leather, plastics, and the like, such as those commonly used in articles such as T shirts, sweat shirts, hats, banners, leather goods, and the like.

As shown in FIGS. 4B-4E, exemplary methods include electrophotographically printing a plurality of layers of toner particles 402 onto a transfer sheet 400 to form an imaged area 404. The plurality of layers of toner particles may be printed using an electrophotographic printer 100 equipped with one or more toner cartridges 102 configured according to the present disclosure. The plurality of layers of toner particles 402 include one or more colorant layers 406 and an adhesive layer 408 on top of the one or more colorant layers 406. The one or more colorant layers 406 each include an array of colorant-layer toner particles. The colorant-layer toner particles include a colorant and a colorant-layer thermoplastic adhesive. The colorant layer may include a cyan colorant, a colorant, a yellow colorant, a white colorant, and/or a black colorant. The adhesive layer 408 includes an array of adhesive-layer toner particles comprising an adhesive-layer thermoplastic adhesive. Next, exemplary methods proceed with applying heat and pressure 410 with a fuser assembly 124 of the printer 100, thereby fusing the imaged area 404 at a fusing temperature. The fusing temperature is selected to heat the colorant-layer thermoplastic adhesive to a temperature greater than an activation temperature of the colorant-layer thermoplastic adhesive, and/or to heat the adhesive-layer thermoplastic adhesive to greater than an activation temperature of the adhesive-layer thermoplastic adhesive. In some embodiments, the fusing temperature may be selected to heat the colorant-layer thermoplastic adhesive to a temperature greater than an activation temperature of the colorant-layer thermoplastic adhesive but less than an activation temperature of the adhesive-layer thermoplastic adhesive. In some embodiments, the fusing temperature may be selected to heat the adhesive-layer thermoplastic adhesive to greater than an activation temperature of the adhesive-layer thermoplastic adhesive but with a fusing time that is less than the time necessary to fully fuse the adhesive-layer thermoplastic adhesive. The fusing temperature may be less than about 135° C. For example, the fusing temperature may be from about 90° C. to 135° C., or from about 90° C. to 120° C., or from about 120° C. to 135° C. As further examples, the fusing temperature may be from about from about 25° C. to 180° C., from about 65° C. to 180° C., from about 80° C. to 120° C., from about 55° C. to 150° C., or from about 25° C. to 100° C.

Figure 4B:
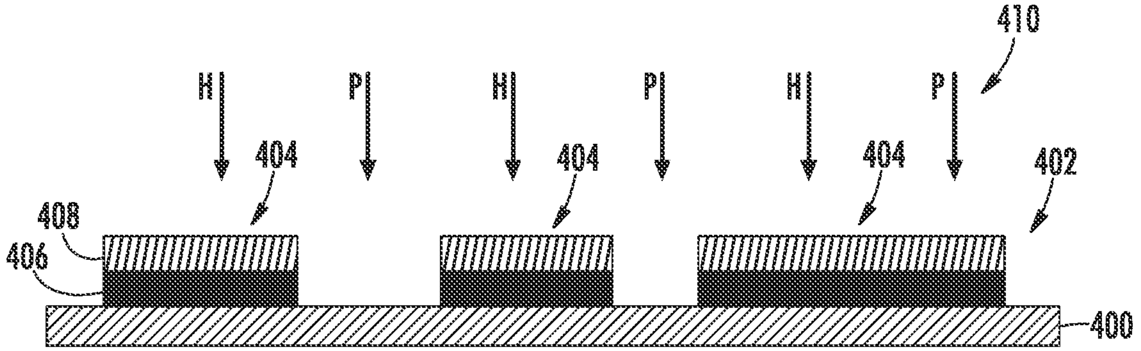
FIGS. 4B-4E schematically show various exemplary layers of toner particles electrophotographically printed on a sheet, such as a transfer sheet.
Figure 4C:
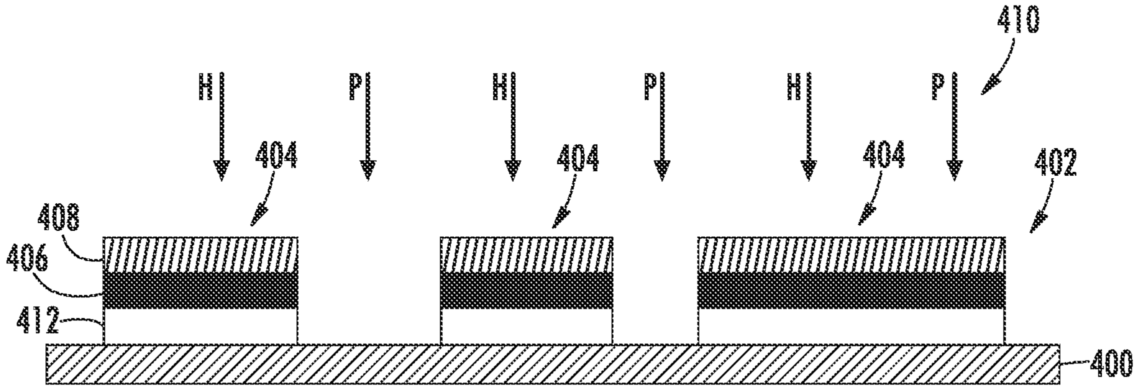
Figure 4D:
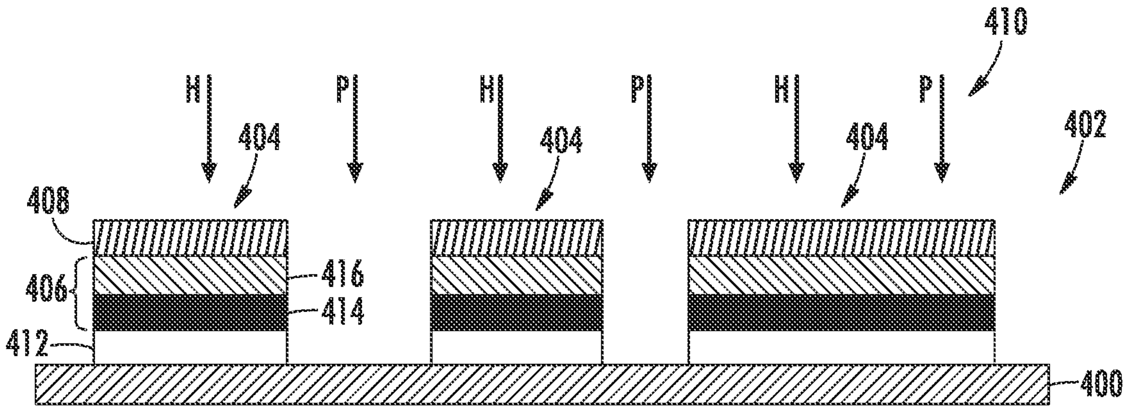
Figure 4E:
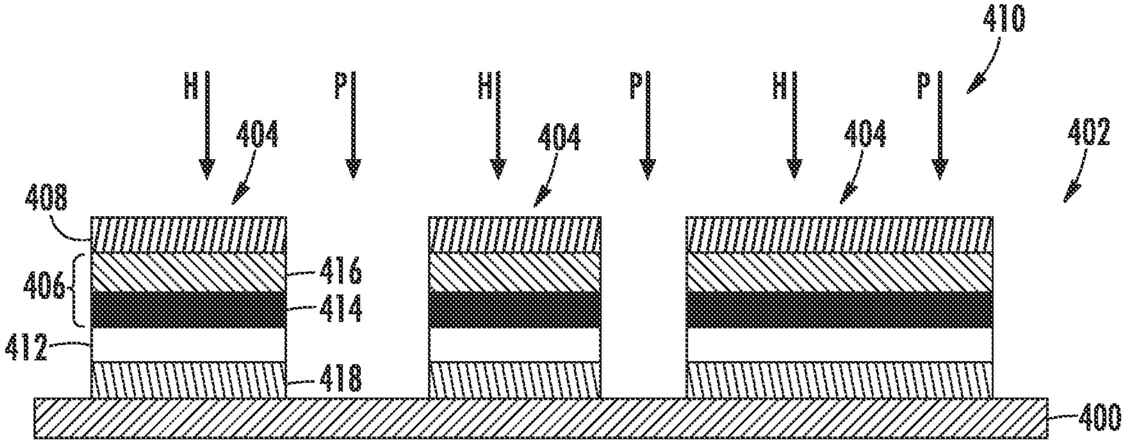

As shown in FIG. 4B, the plurality of layers of toner particles that make up the imaged area 404 may include only the colorant layer 406 and the adhesive layer on top of the colorant layer 404. However, in some embodiments additional layers also may be provided. As shown in FIGS. 4C-4E, the plurality of layers of toner particles may additionally include a coating-layer 412 electrophotographically printed onto the transfer sheet 400, with the one or more colorant layers 406 printed on top of the coating-layer 412. The coating-layer includes an array of coating-layer toner particles, which includes a crosslinking thermoplastic polymer. The array of coating-layer toner particles may further include a pigment or an opacifier.

As shown in FIGS. 4D and 4E, the one or more colorant layers may include at least a first colorant layer 414 and a second colorant layer 416 on top of the at least a first colorant layer 414. In some embodiments, the at least a first colorant layer 414 may include one or more of a cyan colorant layer, a magenta colorant layer, a yellow colorant layer, and/or a black colorant layer, and the second colorant layer may include a white colorant.

In some embodiments, the transfer sheet 400 may not include a release layer. For example, the transfer sheet 400 may be an ordinary sheet of paper or paperboard, in which case a release layer 418 may be electrophotographically printed on the transfer sheet 400 as shown in FIG. 4E. Thus, the plurality of layers of toner particles 402 may include a release layer 418 electrophotographically printed between the transfer sheet 400 and the one or more colorant layers 406. In some embodiments, the release layer may be printed between the transfer sheet 400 and an adhesive-layer 412. The release layer may include a supply of polymeric toner particles. The polymeric toner particles may include one or more of a silicone polymer, a polymer configured to form a polymer lattice, and/or one or more polymers configured to form a copolymeric lattice.

Now referring to FIGS. 5A-5C, 6A-6C, 7A-7C, and 8A-8C, exemplary methods include transferring an electrophotographically printed image to a substrate 500 such as a production medium. The electrophotographically printed image may include an imaged area 404 that was previously printed on a transfer sheet 400, as discussed above with respect to FIGS. 4A-4E. Exemplary methods include positioning the transfer sheet 400 adjacent to the substrate 500, so that the surface of the transfer sheet with the imaged area 404 faces the substrate 500. Next, exemplary methods proceed with applying heat and pressure 502, thereby heat-transferring the imaged area 404 to the substrate 500 at a transfer temperature. The transfer temperature is selected to heat the adhesive-layer thermoplastic adhesive in the adhesive layer 408 to greater than the activation temperature of the adhesive-layer thermoplastic adhesive. Because the transfer temperature is above the activation temperature of the adhesive-layer thermoplastic adhesive, the adhesive layer 408 at least partly melts and/or flows, enabling the adhesive layer 408 to flow onto or into the substrate 500. Thus, the adhesive layer 408 adheres to the substrate 500 and anchors the imaged area 404 on the substrate 500.

The transfer temperature may be greater than about 135° C. For example, the transfer temperature may be from about 145° C. to 205° C., from about 155° C. to 200° C., or from about 160° C. to 190 deg. In some embodiments, the transfer temperature may exceed the fusing temperature by about 10° C. or more. For example, the transfer temperature may exceed the fusing temperature by about 10° C. to 125° C., about 50° C. to 75° C., about 50° C. to 125° C., or about 10° C. to 75° C. As further examples, the transfer temperature may exceed the fusing temperature by about 50° C. or more, about 75° C. or more, about 100° C. or more, or about 125° C. or more.

Exemplary methods conclude by separating the transfer sheet 400 from the substrate 500, leaving the imaged area 404 on the substrate 500, and the adhesive-layer thermoplastic adhesive of the adhesive layer 408 adhering to the substrate 500. The transfer sheet may include a release layer, which may have been pre-applied to the transfer sheet 400, and/or electrophotographically printed onto the transfer sheet 400. As such, upon separation of the transfer sheet 400 from the imaged area following the heat-transfer, the imaged area 404 remains on the substrate 500. Separation can be performed while the temperature of the materials are still hot (i.e., hot peel) or after the materials have cooled from the transfer temperature (i.e., cold peel).

Figure 5A:
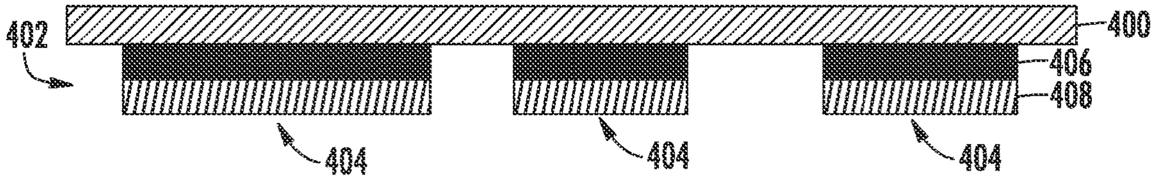
FIGS. 5A-5C schematically show sequential steps in an exemplary method of transferring an image to a substrate, such as a production medium.
Figure 5B:
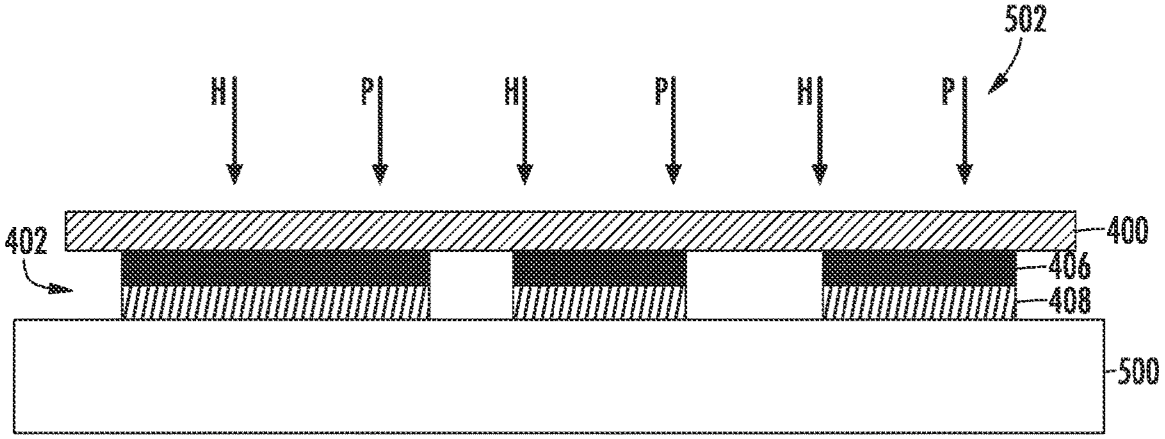
Figure 5C:
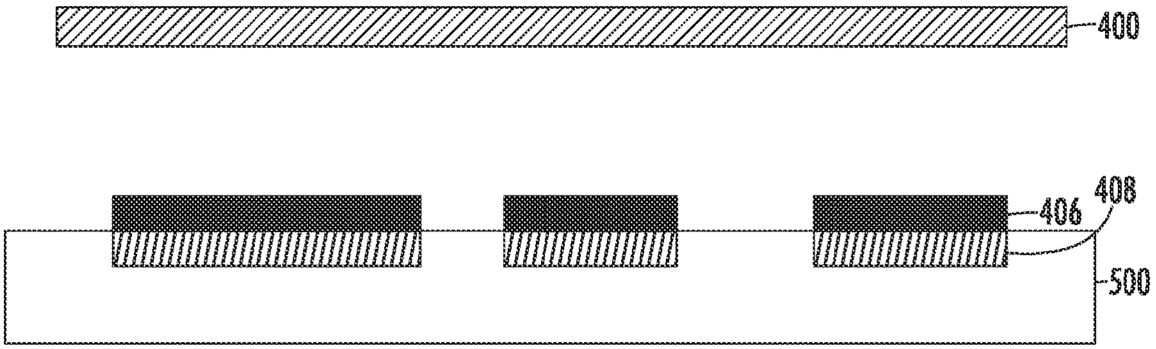
Figure 6A:
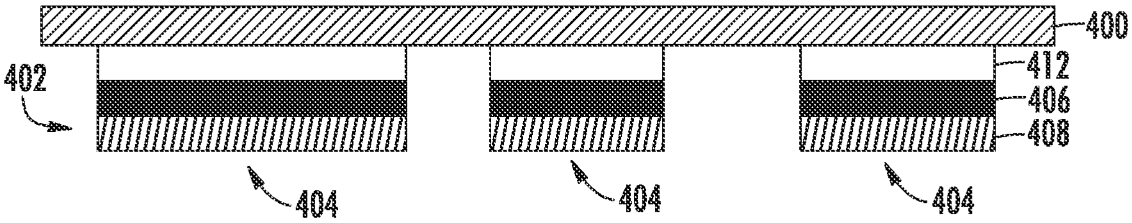
FIGS. 6A-6C schematically show sequential steps in another exemplary method of transferring an image to a substrate, such as a production medium.
Figure 6B:
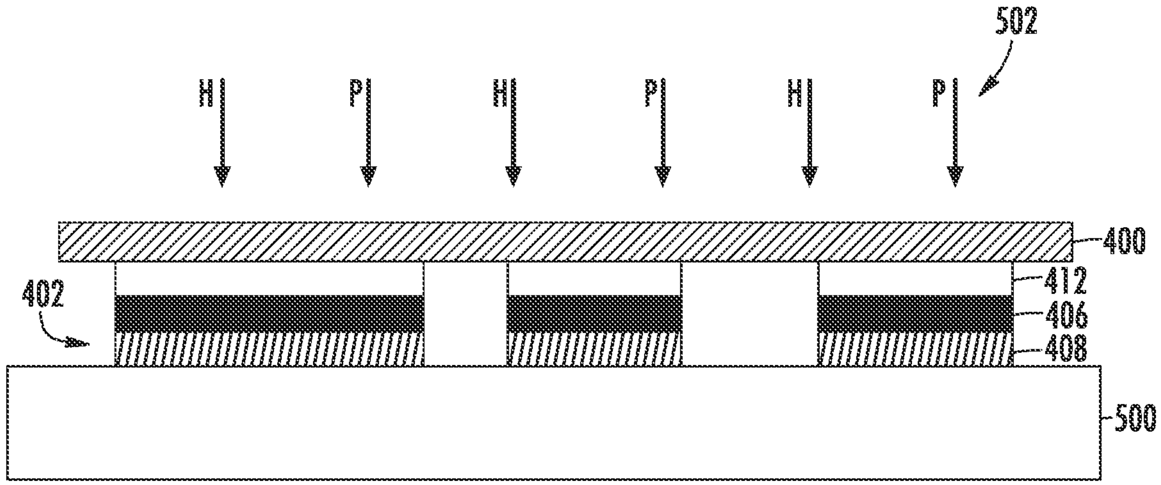
Figure 6C:
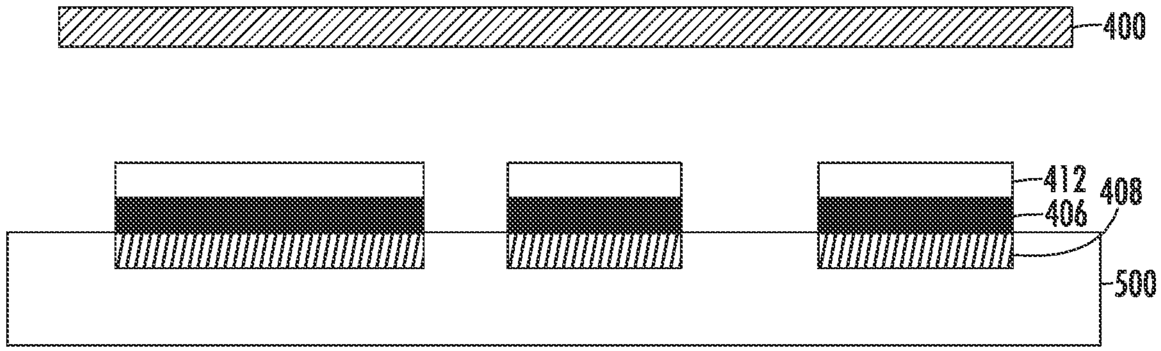
Figure 7A:
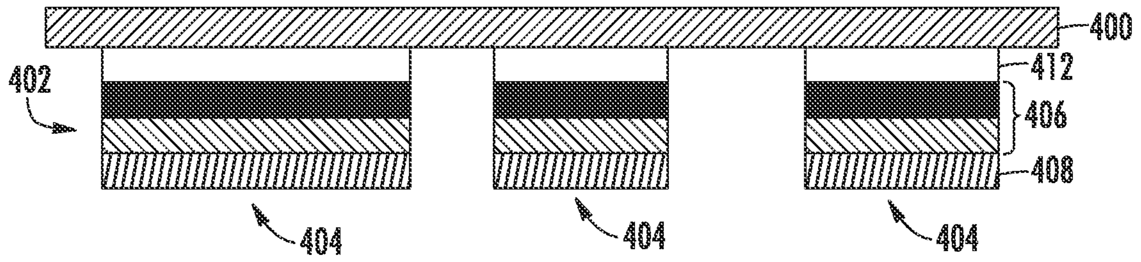
FIGS. 7A-7C schematically show sequential steps in yet another exemplary method of transferring an image to a substrate, such as a production medium.
Figure 7B:
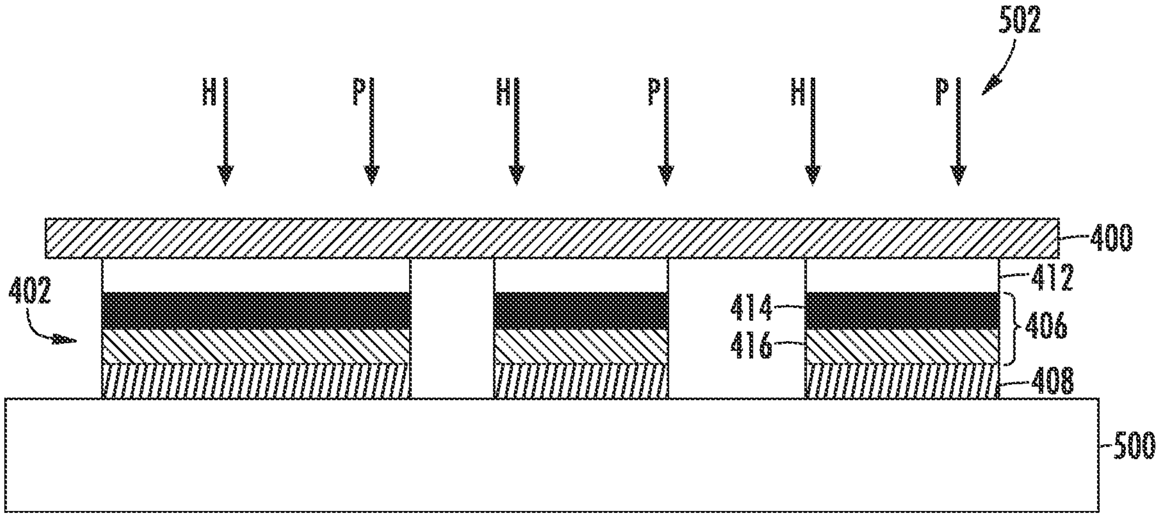
Figure 7C:
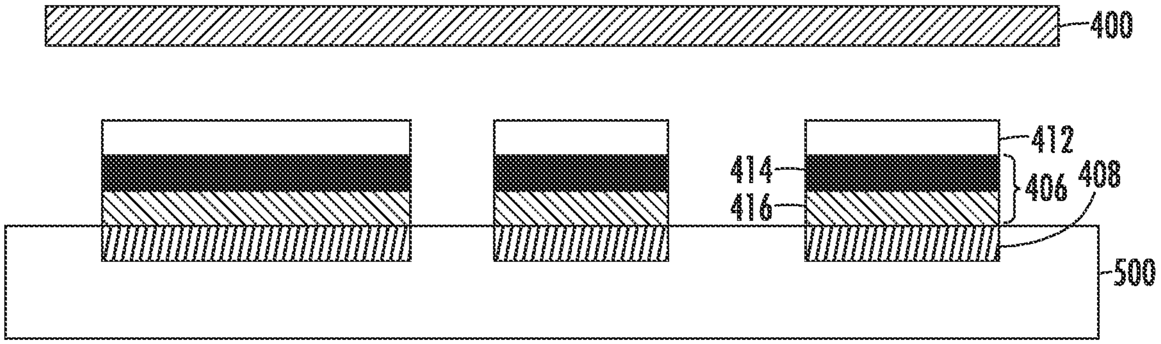
Figure 8A:
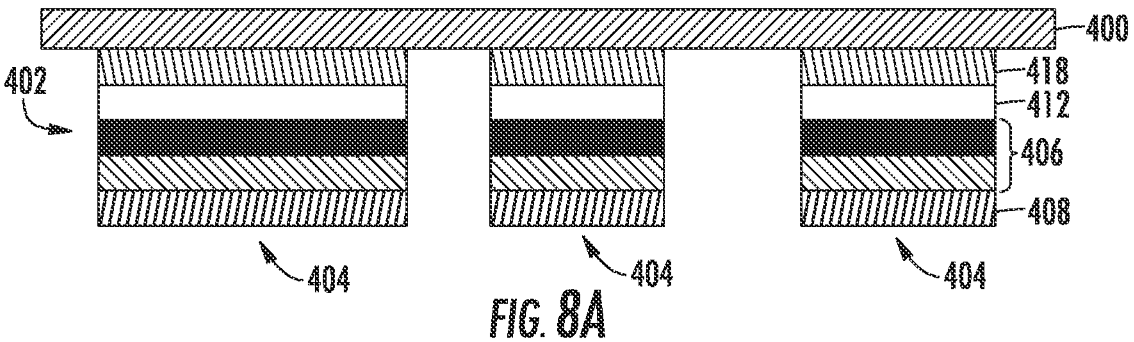
FIGS. 8A-8C schematically show sequential steps in even yet another exemplary method of transferring an image to a substrate, such as a production medium.
Figure 8B:
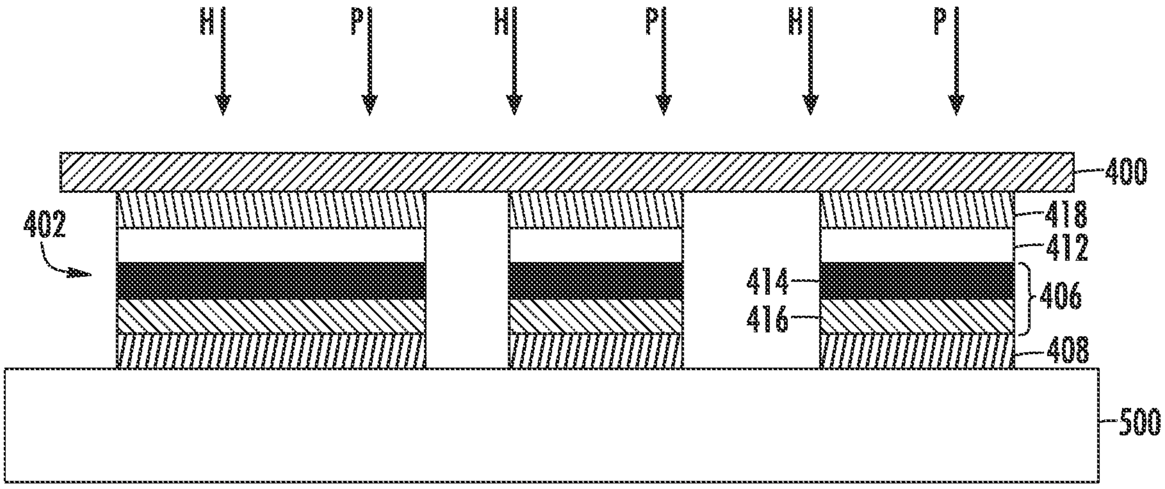
Figure 8C:
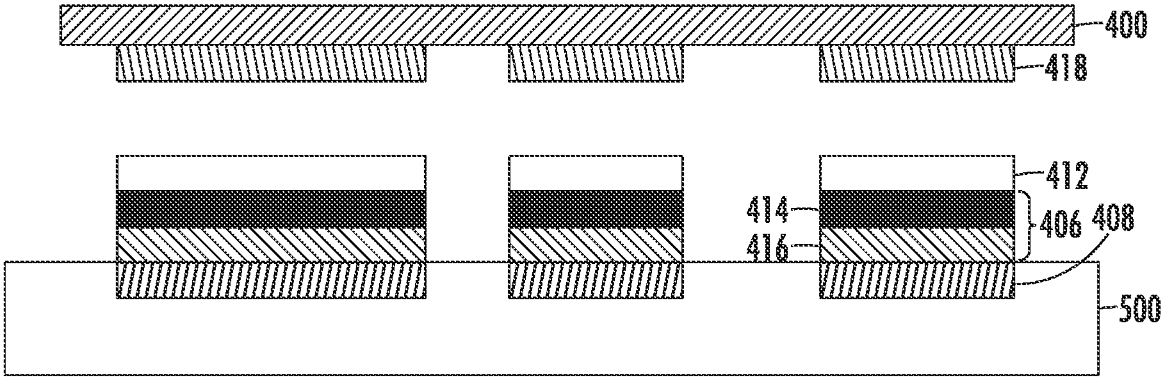

When the imaged area 404 is transferred to the substrate 500, the resulting image is the mirror image of the image printed on the transfer sheet, and the layers of the imaged area 404 are reversed. As shown in FIGS. 5A-5C, the imaged area 404 that transfers to the substrate 500 may include only the colorant layer 406 and the adhesive layer beneath the colorant layer 404 adhering to the substrate 500. However, as discussed above, in some embodiments additional layers also may be provided. As shown in FIGS. 6A-6C, 7A-7C, and 8A-8C, the plurality of layers making up the imaged area may additionally include a coating layer 412. As shown in FIGS. 7A-7C, and 8A-8C, the one or more colorant layers may include at least a first colorant layer 414 on top of a second colorant layer 416. In some embodiments, the at least a first colorant layer 414 may include one or more of a cyan colorant layer, a magenta colorant layer, a yellow colorant layer, and/or a black colorant layer, and the second colorant layer 416 may include a white colorant. As shown in FIGS. 8A-8C, a release layer 418 may be electrophotographically printed on the transfer sheet 400. When the imaged area 404 is transferred to the substrate 500, the release layer 418 remains with the transfer sheet 418.

Figure 9A:
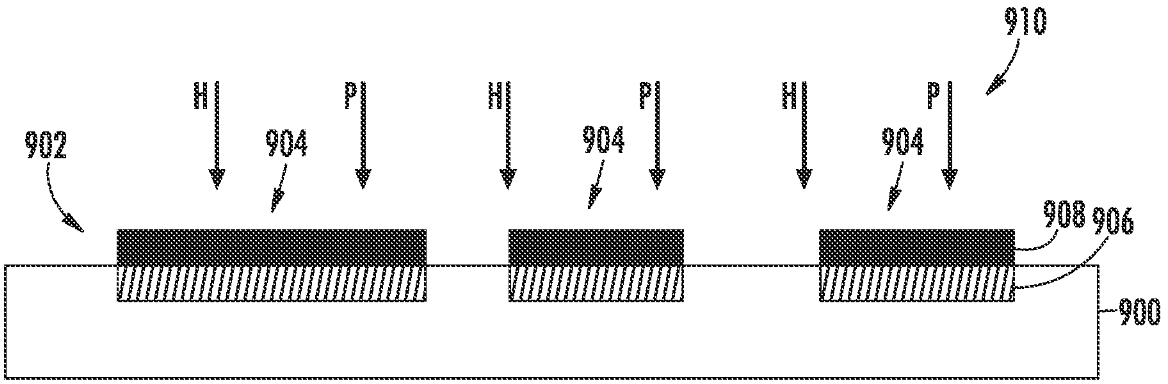
FIGS. 9A-9C schematically show an exemplary method of electrophotographically printing an image directly on a substrate, such as a production medium.
Figure 9B:
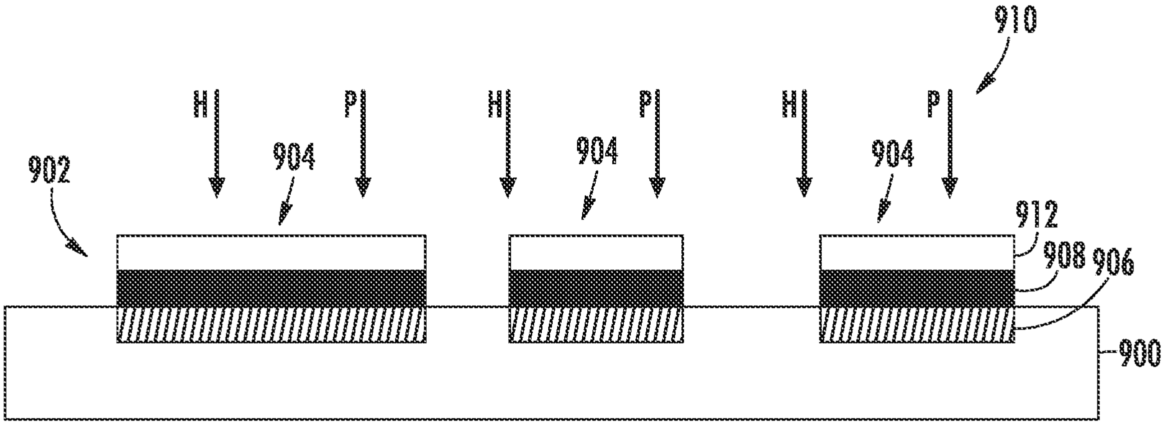
Figure 9C:
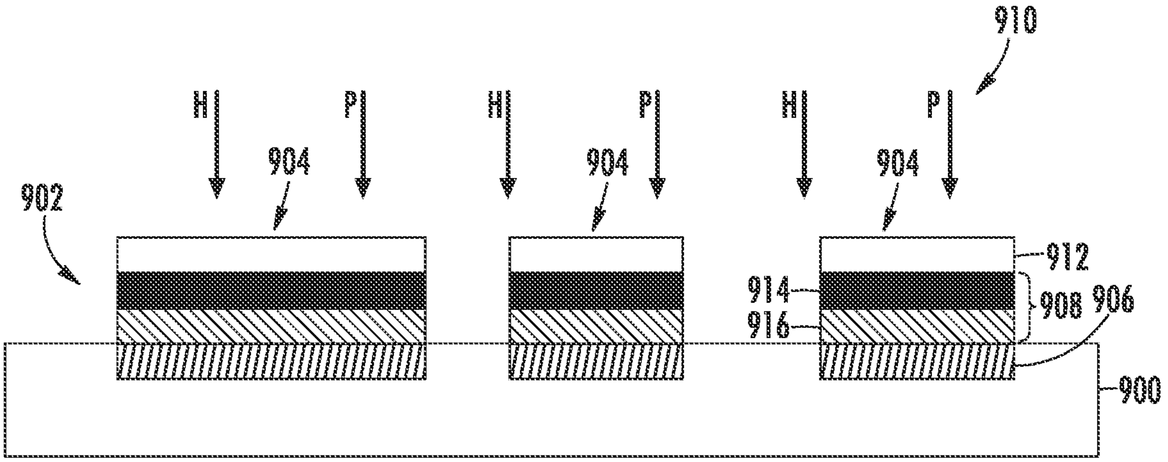

Now turning to FIGS. 9A-9C, exemplary methods include electrophotographically printing an image directly on a substrate 900 such as a production medium. The plurality of layers of toner particles may be printed using an electrophotographic printer 100 equipped with one or more toner cartridges 102 configured according to the present disclosure. A plurality of layers of toner particles 902 may be electrophotographically printing onto the substrate 900 to form an imaged area 904. The plurality of layers include an adhesive layer 906 and one or more colorant layers 908 on top of the adhesive layer 906. The adhesive layer 906 includes an array of adhesive-layer toner particles that includes an adhesive-layer thermoplastic adhesive. The one or more colorant layers 908 each include an array of colorant-layer toner particles. The colorant-layer toner particles include a colorant and a colorant-layer thermoplastic adhesive. The colorant layer may include a cyan colorant, a colorant, a yellow colorant, a white colorant, and/or a black colorant.

Next, exemplary methods proceed with applying heat and pressure 910 with a fuser assembly 124 of the electrophotographic printer 100, thereby fusing the imaged area 904 to the substrate and the plurality of layers to one another. In some embodiments, the fusing may be performed in more than one steps, including a first fusing operation performed at a first fusing temperature and a second fusing operation performed at a second fusing temperature.

The first fusing temperature may be selected to heat the imaged area 904 to a temperature greater than an activation temperature of the colorant-layer thermoplastic adhesive, but less than an activation temperature of the adhesive-layer thermoplastic adhesive. The first fusing at the first fusing temperature may be performed to fuse the plurality of layers 902 to one another, and/or to partially activate the adhesive-layer thermoplastic adhesive prior to fusing subsequent layers of the imaged area 904 so that the adhesive-layer thermoplastic adhesive may be fused both to the substrate 900 and to the other layers of the imaged area 904. The second fusing at the second fusing temperature may be performed to heat the adhesive-layer thermoplastic adhesive to greater than the activation temperature of the adhesive-layer thermoplastic adhesive, thereby fusing and adhering the adhesive-layer thermoplastic adhesive to the substrate 900 and the other layers of the imaged area 904. Because the second fusing temperature is above the activation temperature of the adhesive-layer thermoplastic adhesive, the adhesive layer 906 at least partly melts and/or flows, enabling the adhesive layer 906 to flow onto or into the substrate 900. Thus, the adhesive layer 906 adheres to the substrate 900 and anchors the imaged area 904 on the substrate 900.

The first fusing temperature may be less than about 135° C. For example, the first fusing temperature may be from about 90° C. to 135° C., or from about 90° C. to 120° C., or from about 120° C. to 135° C. As further examples, the first fusing temperature may be from about from about 25° C. to 180° C., from about 65° C. to 180° C., from about 80° C. to 120° C., from about 55° C. to 150° C., or from about 25° C. to 100° C. The second fusing temperature may be greater than about 145° C. For example, the second fusing temperature may be from about 145° C. to 205° C., from about 155° C. to 200° C., or from about 160° C. to 190 deg. In some embodiments, the second fusing temperature may exceed the first fusing temperature by about 10° C. or more. For example, the second fusing temperature may exceed the first fusing temperature by about 10° C. to 125° C., about 50° C. to 75° C., about 50° C. to 125° C., or about 10° C. to 75° C. As further examples, the second fusing temperature may exceed the first fusing temperature by about 50° C. or more, about 75° C. or more, about 100° C. or more, or about 125° C. or more.

As shown in FIG. 9A, the imaged area 904 may include only the adhesive layer 906 and the one or more colorant layers 908 on top of the adhesive layer 906. However, in some embodiments additional layers also may be electrophotographcially printed directly on a substrate 900. For example, as shown in FIG. 9B, the imaged area 904 may include a coating layer 912 electrophotographcially printed on top of the one or more colorant layers 908. As shown in FIG. 9C, the one or more colorant layers may include at least a first colorant layer 914 on top of a second colorant layer 916. In some embodiments, the at least a first colorant layer 914 may include one or more of a cyan colorant layer, a magenta colorant layer, a yellow colorant layer, and/or a black colorant layer, and the second colorant layer 916 may include a white colorant.

The presently disclosed methods allow weeded images to be printed on a transfer sheet and transferred to a production medium, or for weeded images to be printed directly onto a substrate such as a production medium using an electrophotographic printer. The precision of electrophotographic printing allows for a finer level of detail in weeded images, in comparison to other methods that rely on a clean separation of the image from a transfer sheet. In contrast with other methods, the presently disclosed methods allow the various layers of an imaged area to be printed precisely where the image is intended to appear. For example, the adhesive layer and the coating layer may be printed only where the colorant layers appear. Alternatively, in some embodiments a small amount of overlap of the adhesive layer and/or the coating layer may be desired when providing a weeded image. In that case, print logic may be configured to provide a weeded image with such desired amount of overlap in those layers.

Embodiments

Embodied herein are methods of printing an image to a transfer paper, the method comprising: electrophotographically printing a plurality of layers of toner particles onto the transfer sheet to form an imaged area, the plurality of layers of toner particles comprising one or more colorant layers and an adhesive layer on top of the one or more colorant layers, the one or more colorant layers each comprising an array of colorant-layer toner particles comprising a colorant and a colorant-layer thermoplastic adhesive, and the adhesive layer comprising an array of adhesive-layer toner particles comprising an adhesive-layer thermoplastic adhesive;

wherein one or more of the melting temperature, the fusing temperature, or the melt flow rate of the colorant-layer thermoplastic adhesive corresponding to at least one of the one or more colorant layers exceeds one or more of the melting temperature, the fusing temperature, or the melt flow rate of the adhesive-layer thermoplastic adhesive, respectively; and fusing the imaged area at a fusing temperature, the fusing temperature selected to heat the colorant-layer thermoplastic adhesive to a temperature greater than an activation temperature of the colorant-layer thermoplastic adhesive and/or an activation temperature of the adhesive-layer thermoplastic adhesive.

The method of the preceding embodiment can further comprising positioning the transfer sheet comprising the imaged area adjacent to a substrate such that the surface of the transfer sheet with the imaged area faces the substrate;

heat-transferring the imaged area to the substrate at a transfer temperature, the transfer temperature selected to heat the adhesive-layer thermoplastic adhesive to greater than the activation temperature of the adhesive-layer thermoplastic adhesive; and separating the transfer sheet from the substrate, leaving the imaged area on the substrate, the adhesive-layer thermoplastic adhesive adhering to the substrate.

In the method of any one of the preceding embodiments, the melting temperature of the colorant-layer thermoplastic adhesive corresponding to at least one of the one or more colorant layers exceeds the melting temperature of the adhesive-layer thermoplastic adhesive.

In the method of any one of the preceding embodiments, the fusing temperature of the colorant-layer thermoplastic adhesive corresponding to at least one of the one or more colorant layers exceeds the fusing temperature of the adhesive-layer thermoplastic adhesive.

In the method of any one of the preceding embodiments, the melt flow rate of the colorant-layer thermoplastic adhesive corresponding to at least one of the one or more colorant layers exceeds the melt flow rate of the adhesive-layer thermoplastic adhesive.

In the method of any one of the preceding embodiments, the melt volume-flow rate of the adhesive-layer thermoplastic adhesive is between about 10 to 200 $cm^3$/10 min, at 160° C./2.16 kG.

In the method of any one of the preceding embodiments, the melt volume-flow rate of the colorant-layer thermoplastic adhesive corresponding to at least one of the one or more colorant layers exceeds the melt volume-flow rate of the adhesive-layer thermoplastic adhesive by from 1% to 1,000% at 160° C./2.16 kG.

In the method of any one of the preceding embodiments, the adhesive-layer thermoplastic adhesive comprises a polyamide, a polyester, an ethylene vinyl acetate copolymer, a polyolefin, a polyurethane, and/or an epoxy.

In the method of any one of the preceding embodiments, the one or more colorant layers comprises a first colorant layer on top of at least a second colorant layer, the first colorant layer comprising a white colorant, and the at least a second colorant layer comprising one or more of a cyan colorant layer, a magenta colorant layer, a yellow colorant layer, and/or a black colorant layer.

In the method of any one of the preceding embodiments, the colorant-layer thermoplastic adhesive comprises a polyamide, a polyester, an ethylene vinyl acetate copolymer, a polyolefin, a polyurethane, and/or an epoxy.

In the method of any one of the preceding embodiments, the plurality of layers of toner particles further comprises a coating-layer, the coating-layer electrophotographically printed between the transfer sheet and the one or more colorant layers.

In the method of any one of the preceding embodiments, the coating-layer comprises an array of coating-layer toner particles comprising a crosslinking thermoplastic polymer.

In the method of any one of the preceding embodiments, the array of adhesive-layer toner particles further comprises a pigment or an opacifier.

In the method of any one of the preceding embodiments, the plurality of layers of toner particles further comprises a release layer, the release layer electrophotographically printed between the transfer sheet and the one or more colorant layers.

In the method of any one of the preceding embodiments, the release layer comprises a supply of polymeric toner particles, the polymeric toner particles comprising a silicone polymer, a polymer configured to form a polymer lattice, and/or one or more polymers configured to form a copolymeric lattice.

In the method of any one of the preceding embodiments, the polymer configured to form the polymer lattice comprises an acrylic, a polyvinylacetate, a polystyrene, a polyvinyl alcohol, a polyurethane, and/or a polyvinylchloride; and/or In the method of any one of the preceding embodiments, the one or more polymers configured to form the copolymeric lattice comprises ethylene-vinylacetate copolymers, acrylic copolymers, vinyl chloride-acrylics, and/or vinylacetate acrylics.

In the method of any one of the preceding embodiments, the plurality of layers of toner particles comprises a release layer and an adhesive-layer, the release layer electrophotographically printed between the transfer sheet and the adhesive-layer, and the adhesive-layer electrophotographically printed between the release layer and the one or more colorant layers.

In the method of any one of the preceding embodiments, the transfer sheet comprises a paper or paperboard base layer.

In the method of any one of the preceding embodiments, the transfer sheet comprises a base layer and a release layer, the release layer defining a printing surface of the transfer sheet.

In the method of any one of the preceding embodiments, the transfer sheet comprises a conforming layer between the base layer and the release layer.

In the method of any one of the preceding embodiments, the transfer temperature exceeds the fusing temperature by about 10° C. or more.

In the method of any one of the preceding embodiments, the transfer temperature exceeds the fusing temperature by about 10° C. to 125° C., about 50° C. to 75° C., about 50° C. to 125° C., or about 10° C. to 75° C.

In the method of any one of the preceding embodiments, the fusing temperature is less than about 135° C.

In the method of any one of the preceding embodiments, the fusing temperature is from about 90° C. to 135° C., or from about 90° C. to 120° C., or from about 120° C. to 135° C.

In the method of any one of the preceding embodiments, the fusing temperature is from about from about 90° C. to 180° C., from about 65° C. to 180° C., from about 80° C. to 120° C., from about 55° C. to 150° C., or from about 90° C. to 100° C.

In the method of any one of the preceding embodiments, the fusing temperature is selected to heat the adhesive-layer thermoplastic adhesive to a temperature greater than the activation temperature of the adhesive-layer thermoplastic adhesive and wherein the imaged area is exposed to the fusing temperature for a fusing time less than the time necessary to fully fuse the adhesive-layer thermoplastic adhesive.

In the method of any one of the preceding embodiments, the transfer temperature is greater than about 135° C.

In the method of any one of the preceding embodiments, the transfer temperature is from about 135° C. to 205° C., from about 155° C. to 200° C., or from about 160° C. to 190 deg.

In the method of any one of the preceding embodiments, each of the one or more colorant layers are provided from an electrophotographic toner cartridge, the electrophotographic toner cartridges comprising cyan toner particles, magenta toner particles, yellow toner particles, black toner particles, or white toner particles.

In the method of any one of the preceding embodiments, the adhesive-layer thermoplastic adhesive at least partially penetrates into the substrate.

In the method of any one of the preceding embodiments, wherein the method is performed using an electrophotographic toner cartridge preferably selected from an electrophotographic toner cartridge kit at least partially configured according to any one or more of preceding embodiments.

In the method of any one of the preceding embodiments, wherein the method is performed using an electrophotographic toner cartridge kit preferably at least partially configured according to any one or more of the preceding embodiments.

In the method of any one of the preceding embodiments, wherein the method is performed using an electrophotographic printing device preferably at least partially configured according to any one or more of the preceding embodiments.

Embodied herein are also methods of printing an image to a transfer sheet, the method comprising:

electrophotographically printing an adhesive layer on top of an imaged area of the transfer sheet, the imaged area comprising one or more colorant layers each comprising a colorant-layer thermoplastic adhesive, and the adhesive layer comprising an adhesive-layer thermoplastic adhesive;

wherein one or more of the melting temperature, the fusing temperature, or the melt flow rate of the colorant-layer thermoplastic adhesive corresponding to at least one of the one or more colorant layers exceeds one or more of the melting temperature, the fusing temperature, or the melt flow rate of the adhesive-layer thermoplastic adhesive, respectively; and fusing the imaged area at a fusing temperature, the fusing temperature selected to heat the imaged area to a temperature greater than an activation temperature of the adhesive-layer thermoplastic adhesive and/or an activation temperature of the colorant-layer thermoplastic adhesive.

In the method of the preceding embodiment, the method is performed using an electrophotographic toner cartridge selected from an electrophotographic toner cartridge kit preferably at least partially configured according to any one or more of the preceding embodiments.

In the method of any one of the preceding embodiments, the method is performed using an electrophotographic toner cartridge kit preferably at least partially configured according to any one of the preceding embodiments.

In the method of any one of the preceding embodiments, the method is performed using an electrophotographic printing device preferably at least partially configured according to any one of the preceding embodiments.

In the method of any one of the preceding embodiments, further comprising positioning the transfer sheet adjacent to a substrate such that the imaged area faces the substrate; heat-transferring the imaged area to the substrate at a transfer temperature, the transfer temperature selected to heat the adhesive-layer thermoplastic adhesive to greater than the activation temperature of the adhesive-layer thermoplastic adhesive and/or an activation temperature of the colorant-layer thermoplastic adhesive; and separating the transfer sheet from the substrate, leaving the imaged area on the substrate, the adhesive-layer thermoplastic adhesive adhering to the substrate.

In the method of any one of the preceding embodiments, further configured at least partially according to any one of the preceding embodiments.

Embodied herein are electrophotographic toner cartridge kit, the kit comprising:

a first electrophotographic toner cartridge configured to print an adhesive layer, the first electrophotographic toner cartridge comprising:

a first toner container; and a supply of toner particles housed in the first electrophotographic toner container, the first toner particles comprising an adhesive-layer thermoplastic adhesive; and a second electrophotographic toner cartridge configured to print a colorant layer, the second electrophotographic toner cartridge comprising:

a second toner container; and a supply of second toner particles housed in the second toner container, the supply of second toner particles comprising a second colorant and a second colorant-layer thermoplastic adhesive;

wherein the melting temperature, the fusing temperature, or the melt flow rate of the second colorant-layer thermoplastic adhesive exceeds the melting temperature, the fusing temperature, or the melt flow rate of the adhesive-layer thermoplastic adhesive, respectively.

In the kit of any one of the preceding embodiments, the melt volume-flow rate of the adhesive-layer thermoplastic adhesive is between about 10 to 200 $cm^3$/10 min, at 160° C./2.16 kG.

In the kit of any one of the preceding embodiments, the melt volume-flow rate of the second colorant-layer thermoplastic adhesive exceeds the melt volume-flow rate of the adhesive-layer thermoplastic adhesive by from 1% to 1,000% at 160° C./2.16 kG.

In the kit of any one of the preceding embodiments, the adhesive-layer thermoplastic adhesive comprises a polyamide, a polyester, an ethylene vinyl acetate copolymer, a polyolefin, a polyurethane, and/or an epoxy.

In the kit of any one of the preceding embodiments, the second colorant-layer thermoplastic adhesive comprises a polyamide, a polyester, an ethylene vinyl acetate copolymer, a polyolefin, a polyurethane, and/or an epoxy.

In the kit of any one of the preceding embodiments, the first toner particles and/or the supply of second toner particles comprises polymerized toner particles.

In the kit of any one of the preceding embodiments, the second colorant comprises a cyan colorant, a magenta colorant, a yellow colorant, a black colorant, or a white colorant.

In the kit of any one of the preceding embodiments, the colorant comprises one or more of: carbon black, nigrosine dyes, iron black, Naphthol Yellow S, Hansa Yellow (10G, 5G, G), cadmium yellow, yellow iron oxide, yellow ocher, chrome yellow, Titan Yellow, Polyazo Yellow, Oil Yellow, Hansa Yellow (GR, A, RN, R), Pigment Yellow L, Benzidine Yellow (G, GR), Permanent Yellow (NCG), Vulcan Fast Yellow (5G, R), Tartrazine Lake, Quinoline Yellow Lake, anthracene yellow BGL, isoindolinone yellow, coloothar, red lead oxide, lead red, cadmium red, cadmium mercury red, antimony red, Permanent Red 4R, Para Red, Fire Red, parachlororthonitroaniline red, Lithol Fast Scarlet G, Brilliant Fast Scarlet, Brilliant Carmine BS, Permanent Red (F2R, F4R, FRL, FRLL, F4RH), Fast Scarlet VD, Vulcan Fast Rubine B, Brilliant Scarlet G, Uthol Rubine GX, Permanent Red FSR, Brilliant Carmine 6B, Pigment Scarlet 3B, Bordeaux 5B, Toluidine Maroon, Permanent Bordeaux F2K, Helio Bordeaux BL, Bordeaux 10B, BON Maroon Light, BON Maroon Medium, eosine lake, Rhodamine Lake B, Rhodamine Lake Y, Alizarine Lake, Thioindigo Red B, Thioindigo Maroon, Oil Red, quinacridone red, Pyrazolone Red, Polyazo Red, Chrome Vermilion, Benzidine Orange, Perynone Orange, Oil Orange, cobalt blue, cerulean blue, Alkali Blue Lake, Peacock Blue Lake, Victoria Blue Lake, metal-free phthalocyanine blue, Phthalocyanine Blue, Fast Sky Blue, Indanthrene Blue (RS, BC), indigo, ultramarine, Prussian blue, Anthraquinone Blue, Fast Violet B, Methyl Violet Lake, cobalt violet, manganese violet, dioxazine violet, Anthraquinone Violet, chrome green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc white, and lithopone, and combinations these.

In the kit of any one of the preceding embodiments, further comprising: a third electrophotographic toner cartridge configured to print a third colorant, the third electrophotographic toner cartridge comprising: a third toner container; and a supply of third toner particles housed in the third toner container, the supply of third toner particles comprising a third colorant and a third colorant-layer thermoplastic adhesive; wherein the melt flow rate of third colorant-layer thermoplastic adhesive exceeds the melt flow rate of the adhesive-layer thermoplastic adhesive.

In the kit of any one of the preceding embodiments, wherein the supply of third toner particles comprises a white colorant.

In the kit of any one of the preceding embodiments, wherein the melt volume-flow rate of the third colorant-layer thermoplastic adhesive exceeds the melt volume-flow rate of the adhesive-layer thermoplastic adhesive by from 1% to 1,000% at 160° C./2.16 kG.

In the kit of any one of the preceding embodiments, further comprising:

- a fourth electrophotographic toner cartridge configured to print a coating layer, the fourth electrophotographic toner cartridge comprising: a fourth toner container; and a supply of fourth toner particles housed in the fourth toner container, the supply of fourth toner particles comprising a coating-layer thermoplastic adhesive, the coating-layer thermoplastic adhesive comprising a crosslinking thermoplastic polymer.

In the kit of any one of the preceding embodiments, further comprising: a fifth electrophotographic toner cartridge configured to print a release layer, the fifth electrophotographic toner cartridge comprising: a fifth toner container; and a supply of fifth toner particles housed in the fifth toner container, the supply of fifth toner particles comprising a supply of polymeric toner particles, the polymeric toner particles comprising a silicone polymer, a polymer configured to form a polymer lattice, and/or one or more polymers configured to form a copolymeric lattice.

In the kit of any one of the preceding embodiments, further configured at least partially according to any one or more of the preceding embodiments.

Embodied herein are electrophotographic printing device, the device comprising: a first electrophotographic toner cartridge configured to print an adhesive layer, the first electrophotographic toner cartridge comprising: a first toner container; and a supply of first toner particles housed in the first toner container, the first toner particles comprising an adhesive-layer thermoplastic adhesive; a second electrophotographic toner cartridge configured to print a colorant layer, the second electrophotographic toner cartridge comprising: a second toner container; and a supply of second toner particles housed in the second toner container, the supply of second toner particles comprising a second colorant and a second colorant-layer thermoplastic adhesive; wherein the melting temperature, the fusing temperature, or the melt flow rate of the second colorant-layer thermoplastic adhesive exceeds the melting temperature, the fusing temperature, or the melt flow rate of the adhesive-layer thermoplastic adhesive;

- a photoconductor drum operably engaged with the first electrophotographic toner cartridge and/or the second electrophotographic toner cartridge, the photoconductor drum configured to carry a latent electrostatic image formed by light irradiation from an exposure device, wherein an array of toner particles from the first electrophotographic toner cartridge and/or the second electrophotographic toner cartridge cling to the latent electrostatic image as the photoconductor drum rotates in cooperation with the first electrophotographic toner cartridge and/or the second electrophotographic toner cartridge;
- a transfer assembly operably configured to transport a substrate past the photoconductor drum, the array of toner particles transferring from the photoconductor drum to the substrate; and
- a fuser assembly operably configured to apply heat to the array of toner particles on the substrate at a fusing temperature;
- wherein the fusing temperature is selected to heat the array of toner particles on the substrate to greater than an activation temperature of the colorant-layer thermoplastic adhesive and/or an activation temperature of the adhesive-layer thermoplastic adhesive.

In the device of any one of the preceding embodiments, wherein the first electrophotographic toner cartridge further comprises a supply roller and/or a developer roller operably configured to transfer the array of toner particles from the supply of first toner particles to the photoconductor drum.

In the device of any one of the preceding embodiments, wherein the photoconductor drum is incorporated into the first electrophotographic toner cartridge.

In the device of any one of the preceding embodiments, wherein the photoconductor drum is separate from the first electrophotographic toner cartridge.

Embodied herein are electrophotographic printing devices, the devices comprising: a first electrophotographic toner cartridge configured to print an adhesive layer, the first electrophotographic toner cartridge comprising: a first toner container; a supply of first toner particles housed in the first toner container, the first toner particles comprising an adhesive-layer thermoplastic adhesive; and a first photoconductor drum configured to carry a first latent electrostatic image formed by light irradiation from an exposure device, wherein an array of first toner particles cling to the first latent electrostatic image as the first photoconductor drum rotates in cooperation with the first electrophotographic toner cartridge; a second electrophotographic toner cartridge configured to print a colorant layer, the second electrophotographic toner cartridge comprising: a second toner container; and a supply of second toner particles housed in the second toner container, the second toner particles comprising a second colorant and a second colorant-layer thermoplastic adhesive;

- a second photoconductor drum configured to carry a second latent electrostatic image formed by light irradiation from an exposure device, wherein an array of second toner particles cling to the second latent electrostatic image as the second photoconductor drum rotates in cooperation with the second electrophotographic toner cartridge;
- a transfer assembly operably configured to transport a substrate past the first photoconductor drum and the second photoconductor drum, the array of first toner particles transferring from the first photoconductor drum to the substrate and the array of second toner particles transferring from the second photoconductor drum to the substrate; and a fuser assembly operably configured to apply heat to the array of first toner particles and the array of second toner particles at a fusing temperature;

wherein the fusing temperature is selected to heat the array of first toner particles and/or the array of second toner particles to a temperature greater than an activation temperature of the adhesive-layer thermoplastic adhesive and/or an activation temperature of the second colorant-layer thermoplastic adhesive.

In the device of any one of the preceding embodiments, further comprising:

a third electrophotographic toner cartridge configured to print a colorant layer, the third electrophotographic toner cartridge comprising: a third toner container; a supply of third toner particles housed in the third toner container, the third toner particles comprising a third colorant and a third colorant-layer thermoplastic adhesive; and a third photoconductor drum configured to carry a third latent electrostatic image formed by light irradiation from an exposure device, wherein an array of third toner particles cling to the third latent electrostatic image as the third photoconductor drum rotates in cooperation with the third electrophotographic toner cartridge;

wherein the transfer assembly is operably configured to transport the substrate past the third photoconductor drum; and wherein the fuser assembly is operably configured to apply heat to the array of third toner particles at the fusing temperature;

wherein the fusing temperature is selected to heat the array of third toner particles to a temperature greater than an activation temperature of the adhesive-layer thermoplastic adhesive and/or an activation temperature of the third colorant-layer thermoplastic adhesive.

In the device of any one of the preceding embodiments, further comprising: a fourth electrophotographic toner cartridge configured to print a coating layer, the fourth electrophotographic toner cartridge comprising: a fourth toner container; a supply of fourth toner particles housed in the fourth toner container, the fourth toner particles comprising a coating-layer thermoplastic adhesive, the coating-layer thermoplastic adhesive comprising a crosslinking thermoplastic polymer; and a fourth photoconductor drum configured to carry a fourth latent electrostatic image formed by light irradiation from an exposure device, wherein an array of fourth toner particles cling to the fourth latent electrostatic image as the fourth photoconductor drum rotates in cooperation with the fourth electrophotographic toner cartridge;

wherein the transfer assembly is operably configured to transport the substrate past the fourth photoconductor drum, the array of fourth toner particles transferring from the fourth photoconductor drum to the substrate; and wherein the fuser assembly is operably configured to apply heat to the array of fourth toner particles at the fusing temperature;

wherein the fusing temperature is selected to heat the array of fourth toner particles to a temperature greater than an activation temperature of the adhesive-layer thermoplastic adhesive and/or an activation temperature of the crosslinking thermoplastic polymer of the coating-layer thermoplastic adhesive.

In the device of any one of the preceding embodiments, wherein: the second toner particles are configured to provide a cyan colorant layer, a magenta colorant layer, a yellow colorant layer, or a black colorant layer; and/or the third toner particles are configured to provide a white colorant layer.

In the device of any one of the preceding embodiments, wherein the substrate comprises a transfer sheet.

In the device of any one of the preceding embodiments, wherein the electrophotographic printing device is configured to layer upon the substrate: the array of second toner particles onto the substrate; and the array of first toner particles on top of the array of second toner particles: and wherein the substrate comprises a transfer sheet.

In the device of any one of the preceding embodiments, wherein the electrophotographic printing device is configured to layer upon the substrate: the array of third toner particles onto the substrate; the array of second toner particles on top of the array of third toner particles; and the array of first toner particles on top of the array of second toner particles; and wherein the substrate comprises a transfer sheet.

In the device of any one of the preceding embodiments, wherein the electrophotographic printing device is configured to layer upon the substrate: the array of fourth toner particles onto the substrate; the array of third toner particles on top of the array of fourth toner particles; the array of second toner particles on top of the array of third toner particles; and the array of first toner particles on top of the array of second toner particles; and wherein the substrate comprises a transfer sheet.

In the device of any one of the preceding embodiments, wherein the fuser assembly comprises: a first fuser assembly operably configured to apply heat to the array of first toner particles and/or to the array of second toner particles at a first fusing temperature; and a second fuser assembly operably configured to apply heat to the array of first toner particles and/or to the array of second toner particles at a second fusing temperature; wherein the first fusing temperature is selected to heat the array of first toner particles and/or the array of second toner particles to a temperature greater than the activation temperature of the adhesive-layer thermoplastic adhesive and wherein the array of first toner particles and/or the array of second toner particles are exposed to the first fusing temperature for a fusing time less than the time necessary to fully fuse the adhesive-layer thermoplastic adhesive; and wherein the second fusing temperature is selected to heat the adhesive-layer thermoplastic adhesive to greater than the activation temperature of the adhesive-layer thermoplastic adhesive.

In the device of any one of the preceding embodiments, wherein the first fuser assembly is located downstream from the first electrophotographic toner cartridge.

In the device of any one of the preceding embodiments, wherein the second fuser assembly is located upstream from the first electrophotographic toner cartridge.

Embodied here are electrophotographic printing device, the device comprising: a first electrophotographic toner cartridge configured to print an adhesive layer, the first electrophotographic toner cartridge comprising: a first toner container; a supply of first toner particles housed in the first toner container, the first toner particles comprising an adhesive-layer thermoplastic adhesive; and a second electrophotographic toner cartridge configured to print a colorant layer, the second electrophotographic toner cartridge comprising: a second toner container; and a supply of second toner particles housed in the second toner container, the second toner particles comprising a second colorant and a second colorant-layer thermoplastic adhesive; a photoconductor drum configured to carry a first latent electrostatic image and a second latent electrostatic image each formed by light irradiation from an exposure device, wherein an array of first toner particles cling to a first latent electrostatic image as the photoconductor drum rotates in cooperation with the first electrophotographic toner cartridge, and an array of second toner particles cling to a second electrostatic image as the photoconductor drum rotates in cooperation with the second electrophotographic toner cartridge; a transfer assembly operably configured to transport a substrate past the photoconductor drum to transfer the array of first toner particles and the array of second toner particles from the photoconductor drum to the substrate; and a fuser assembly operably configured to apply heat to the first toner particles and the second toner particles on the substrate at a fusing temperature;

wherein the fusing temperature is selected to heat the array of first toner particles and/or the array of second toner particles to a temperature greater than an activation temperature of the adhesive-layer thermoplastic adhesive and/or an activation temperature of the second colorant-layer thermoplastic adhesive.

In the device of any one of the preceding embodiments, further comprising: a third electrophotographic toner cartridge configured to print a colorant layer, the third electrophotographic toner cartridge comprising: a third toner container; a supply of third toner particles housed in the third toner container, the third toner particles comprising a third colorant and a third colorant-layer thermoplastic adhesive; and wherein an array of third toner particles cling to the latent electrostatic image as the photoconductor drum rotates in cooperation with the third electrophotographic toner cartridge;

wherein the transfer assembly is operably configured to transfer the array of third toner particles from the photoconductor drum to the substrate; and wherein the fuser assembly is operably configured to apply heat to the array of third toner particles at the fusing temperature;

wherein the fusing temperature is selected to heat the array of third toner particles to a temperature greater than an activation temperature of the adhesive-layer thermoplastic adhesive and/or an activation temperature of the third colorant-layer thermoplastic adhesive.

In the device of any one of the preceding embodiments, further comprising: a fourth electrophotographic toner cartridge configured to print a coating layer, the fourth electrophotographic toner cartridge comprising: a fourth toner container; a supply of fourth toner particles housed in the fourth toner container, the fourth toner particles comprising a coating-layer thermoplastic adhesive, the coating-layer thermoplastic adhesive comprising a crosslinking thermoplastic polymer; and wherein an array of fourth toner particles cling to the latent electrostatic image as the photoconductor drum rotates in cooperation with the fourth electrophotographic toner cartridge;

wherein the transfer assembly is operably configured to transfer the array of fourth toner particles from the photoconductor drum to the substrate; and wherein the fuser assembly is operably configured to apply heat to the array of fourth toner particles at the fusing temperature;

wherein the fusing temperature is selected to heat the array of fourth toner particles to a temperature greater than an activation temperature of the adhesive-layer thermoplastic adhesive and/or an activation temperature of the crosslinking thermoplastic polymer of the coating-layer thermoplastic adhesive.

In the device of any one of the preceding embodiments, wherein: the second toner particles are configured to provide a cyan colorant layer, a magenta colorant layer, a yellow colorant layer, or a black colorant layer; and/or the supply of third toner particles are configured to provide a white colorant layer.

In the device of any one of the preceding embodiments, wherein the substrate comprises a transfer sheet.

In the device of any one of the preceding embodiments, wherein the electrophotographic printing device is configured to layer upon the substrate: the array of second toner particles onto the substrate; and the array of first toner particles on top of the array of second toner particles: and wherein the substrate comprises a transfer sheet.

In the device of any one of the preceding embodiments, wherein the electrophotographic printing device is configured to layer upon the substrate: the array of third toner particles onto the substrate; the array of second toner particles on top of the array of third toner particles; and the array of first toner particles on top of the array of second toner particles; and wherein the substrate comprises a transfer sheet.

In the device of any one of the preceding embodiments, wherein the electrophotographic printing device is configured to layer upon the substrate: the array of fourth toner particles onto the substrate; the array of third toner particles on top of the array of fourth toner particles; the array of second toner particles on top of the array of third toner particles; and the array of first toner particles on top of the array of second toner particles; and wherein the substrate comprises a transfer sheet.

In the device of any one of the preceding embodiments, wherein the fuser assembly comprises:

a first fuser assembly operably configured to apply heat to the array of first toner particles and/or to the array of second toner particles at a first fusing temperature; and a second fuser assembly operably configured to apply heat to the array of first toner particles and/or to the array of second toner particles at a second fusing temperature;

wherein the first fusing temperature is selected to heat the array of first toner particles and/or the array of second toner particles to a temperature greater than the activation temperature of the adhesive-layer thermoplastic adhesive and wherein the array of first toner particles and/or the array of second toner particles are exposed to the first fusing temperature for a fusing time less than the time necessary to fully fuse the adhesive-layer thermoplastic adhesive; and wherein the second fusing temperature is selected to heat the adhesive-layer thermoplastic adhesive to greater than the activation temperature of the adhesive-layer thermoplastic adhesive.

In the device of any one of the preceding embodiments, wherein the first fuser assembly is located downstream from the first electrophotographic toner cartridge.

In the device of any one of the preceding embodiments, wherein the second fuser assembly is located upstream from the first electrophotographic toner cartridge.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed:

1. A method of printing an image to a transfer sheet, the method comprising:

electrophotographically printing a plurality of layers of toner particles onto the transfer sheet to form an imaged area, the plurality of layers of toner particles comprising one or more colorant layers and an adhesive layer on top of the one or more colorant layers, the one or more colorant layers each comprising an array of colorant-layer toner particles comprising a colorant and a colorant-layer thermoplastic adhesive provided as particles having a diameter of from about 2 to about 50 micrometers, and the adhesive layer comprising an array of adhesive-layer toner particles comprising an adhesive-layer thermoplastic adhesive;

wherein one or more of a melting temperature, a fusing temperature, or a melt flow rate of the colorant-layer thermoplastic adhesive corresponding to at least one of the one or more colorant layers exceeds one or more of the melting temperature, the fusing temperature, or the melt flow rate of the adhesive-layer thermoplastic adhesive, respectively; and fusing the imaged area at a fusing temperature, the fusing temperature selected to heat the colorant-layer thermoplastic adhesive to a temperature greater than an activation temperature of the colorant-layer thermoplastic adhesive and/or an activation temperature of the adhesive-layer thermoplastic adhesive.

2. The method of claim 1, further comprising positioning the transfer sheet comprising the imaged area adjacent to a substrate such that a surface of the transfer sheet with the imaged area faces the substrate;

heat-transferring the imaged area to the substrate at a transfer temperature, the transfer temperature selected to heat the adhesive-layer thermoplastic adhesive to greater than the activation temperature of the adhesive-layer thermoplastic adhesive; and separating the transfer sheet from the substrate, leaving the imaged area on the substrate, the adhesive-layer thermoplastic adhesive adhering to the substrate.

3. The method of claim 1, wherein the melting temperature of the colorant-layer thermoplastic adhesive corresponding to at least one of the one or more colorant layers exceeds the melting temperature of the adhesive-layer thermoplastic adhesive; the fusing temperature of the colorant-layer thermoplastic adhesive corresponding to at least one of the one or more colorant layers exceeds the fusing temperature of the adhesive-layer thermoplastic adhesive; or the melt flow rate of the colorant-layer thermoplastic adhesive corresponding to at least one of the one or more colorant layers exceeds the melt flow rate of the adhesive-layer thermoplastic adhesive.

4. The method of claim 1, wherein the plurality of layers of toner particles further comprises a release layer, the release layer electrophotographically printed between the transfer sheet and the one or more colorant layers.

5. The method of claim 1, wherein the transfer sheet comprises a paper or paperboard base layer.

6. The method of claim 1, wherein the transfer sheet comprises a base layer and a release layer, the release layer defining a printing surface of the transfer sheet.

7. The method of claim 2, wherein the transfer temperature exceeds the fusing temperature by about 10° C. to 125° C.

8. The method of claim 1, wherein the fusing temperature is selected to heat the adhesive-layer thermoplastic adhesive to a temperature greater than the activation temperature of the adhesive-layer thermoplastic adhesive and wherein the imaged area is exposed to the fusing temperature for a fusing time less than the time necessary to fully fuse the adhesive-layer thermoplastic adhesive.

9. The method of claim 1, wherein the method is performed using an electrophotographic toner cartridge or an electrophotographic printing device.

10. The method of claim 1, wherein the melt volume-flow rate of the colorant-layer thermoplastic adhesive exceeds the melt volume flow rate of the adhesive-layer thermoplastic adhesive by 5% or more at 160° C./2.16 kG.

11. A method of printing an image to a transfer sheet, the method comprising:

electrophotographically printing an adhesive layer on top of an imaged area of the transfer sheet, the imaged area comprising one or more colorant layers each comprising a colorant-layer thermoplastic adhesive provided as particles having a diameter of from about 2 to about 50 micrometers, and the adhesive layer comprising an adhesive-layer thermoplastic adhesive;

wherein one or more of a melting temperature, a fusing temperature, or a melt flow rate of the colorant-layer thermoplastic adhesive corresponding to at least one of the one or more colorant layers exceeds one or more of the melting temperature, the fusing temperature, or the melt flow rate of the adhesive-layer thermoplastic adhesive, respectively; and fusing the imaged area at a fusing temperature, the fusing temperature selected to heat the imaged area to a temperature greater than an activation temperature of the adhesive-layer thermoplastic adhesive and/or an activation temperature of the colorant-layer thermoplastic adhesive.

12. The method of claim 11, wherein the method is performed using an electrophotographic toner cartridge or an electrophotographic printing device.

13. The method of claim 11, further comprising positioning the transfer sheet adjacent to a substrate such that the imaged area faces the substrate;

heat-transferring the imaged area to the substrate at a transfer temperature, the transfer temperature selected to heat the adhesive-layer thermoplastic adhesive to greater than the activation temperature of the adhesive-layer thermoplastic adhesive and/or an activation temperature of the colorant-layer thermoplastic adhesive; and separating the transfer sheet from the substrate, leaving the imaged area on the substrate, the adhesive-layer thermoplastic adhesive adhering to the substrate.

14. The method of claim 11, wherein the melt volume-flow rate of the colorant-layer thermoplastic adhesive exceeds the melt volume flow rate of the adhesive-layer thermoplastic adhesive by 5% or more at 160° C./2.16 kG.

15. An electrophotographic toner cartridge kit, the kit comprising:

a first electrophotographic toner cartridge configured to print an adhesive layer, the first electrophotographic toner cartridge comprising:

a first toner container;

a supply of toner particles housed in the first electrophotographic toner container, the first toner particles comprising an adhesive-layer thermoplastic adhesive;

a second electrophotographic toner cartridge configured to print a colorant layer, the second electrophotographic toner cartridge comprising:

a second toner container; and a supply of second toner particles housed in the second toner container, the supply of second toner particles comprising a second colorant and a second colorant-layer thermoplastic adhesive provided as particles having a diameter of from about 2 to about 50 micrometers;

wherein a melting temperature, a fusing temperature, or a melt flow rate of the second colorant-layer thermoplastic adhesive exceeds the melting temperature, the fusing temperature, or the melt flow rate of the adhesive-layer thermoplastic adhesive, respectively.

16. The electrophotographic toner cartridge kit of claim 15, wherein the melt flow rate of the adhesive-layer thermoplastic adhesive is between about 10 to 200 $cm^3$/10 min, at 160° C./2.16 kG.

17. The electrophotographic toner cartridge kit of claim 15, wherein the melt flow rate of the second colorant-layer thermoplastic adhesive exceeds the melt volume-flow rate of the adhesive-layer thermoplastic adhesive by from 1% to 1,000% at 160° C./2.16 kG.

18. An electrophotographic printing device, the device comprising:

the electrophotographic toner cartridge kit according to claim 15;

a first photoconductor drum operably engaged with the first electrophotographic toner cartridge and/or the second electrophotographic toner cartridge, the first photoconductor drum configured to carry a first latent electrostatic image formed by light irradiation from an exposure device, wherein an array of first toner particles from the first electrophotographic toner cartridge and/or the second electrophotographic toner cartridge cling to the first latent electrostatic image as the first photoconductor drum rotates in cooperation with the first electrophotographic toner cartridge and/or the second electrophotographic toner cartridge;

a transfer assembly operably configured to transport a substrate past the first photoconductor drum, the array of toner particles transferring from the first photoconductor drum to the substrate; and a fuser assembly operably configured to apply heat to the array of toner particles on the substrate at a fusing temperature;

wherein the fusing temperature is selected to heat the array of toner particles on the substrate to greater than an activation temperature of the colorant-layer thermoplastic adhesive and/or an activation temperature of the adhesive-layer thermoplastic adhesive.

19. The electrophotographic printing device of claim 18, wherein the first electrophotographic toner cartridge further comprises a supply roller and/or a developer roller operably configured to transfer the array of toner particles from the supply of first toner particles to the first photoconductor drum.

20. The electrophotographic printing device of claim 18, further comprising:

a second photoconductor drum configured to carry a second latent electrostatic image formed by light irradiation from an exposure device, wherein an array of second toner particles cling to the second latent electrostatic image as the second photoconductor drum rotates in cooperation with the second electrophotographic toner cartridge;

wherein the transfer assembly is operably configured to transport the substrate past the first photoconductor drum and the second photoconductor drum, the array of first toner particles transferring from the first photoconductor drum to the substrate and the array of second toner particles transferring from the second photoconductor drum to the substrate; and wherein the fuser assembly is operably configured to apply heat to the array of first toner particles and the array of second toner particles at the fusing temperature;

wherein the fusing temperature is selected to heat the array of first toner particles and/or the array of second toner particles to greater than the activation temperature of the adhesive-layer thermoplastic adhesive and/or an activation temperature of the second colorant-layer thermoplastic adhesive.

21. The electrophotographic printing device of claim 18, wherein the electrophotographic printing device is configured to layer upon the substrate:

the array of second toner particles onto the substrate; and the array of first toner particles on top of the array of second toner particles:

wherein the substrate comprises a transfer sheet.

22. The electrophotographic printing device of claim 18, wherein the first photoconductor drum is configured to carry the first latent electrostatic image and a second latent electrostatic image each formed by light irradiation from the exposure device, wherein the array of first toner particles cling to a first latent electrostatic image as the first photoconductor drum rotates in cooperation with the first electrophotographic toner cartridge, and an array of second toner particles cling to the second latent electrostatic image as the first photoconductor drum rotates in cooperation with the second electrophotographic toner cartridge;

wherein the transfer assembly is operably configured to transport the substrate past the first photoconductor drum to transfer the array of first toner particles and the array of second toner particles from the first photoconductor drum to the substrate; and wherein the fuser assembly is operably configured to apply heat to the first toner particles and the second toner particles on the substrate at the fusing temperature;

wherein the fusing temperature is selected to heat the array of first toner particles and/or the array of second toner particles to greater than the activation temperature of the adhesive-layer thermoplastic adhesive and/or an activation temperature of the second colorant-layer thermoplastic adhesive.

23. The kit of claim 15, wherein the melt volume-flow rate of the second colorant-layer thermoplastic adhesive exceeds the melt volume flow rate of the adhesive-layer thermoplastic adhesive by 5% or more at 160° C./2.16 kG.

* * * * *